United States Patent
Zhao et al.

(10) Patent No.: US 11,520,820 B2
(45) Date of Patent: Dec. 6, 2022

(54) MEDIA INFORMATION DISPLAY METHOD AND APPARATUS, AND COMPUTER STORAGE MEDIUM

(71) Applicant: TENCENT TECHNOLOGY (SHENZHEN) COMPANY LIMITED, Guangdong (CN)

(72) Inventors: Hanqing Zhao, Shenzhen (CN); Qi He, Shenzhen (CN); Mengting Jiang, Shenzhen (CN); Huizhong Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 624 days.

(21) Appl. No.: 16/305,593

(22) PCT Filed: Jul. 19, 2017

(86) PCT No.: PCT/CN2017/093555
§ 371 (c)(1),
(2) Date: Nov. 29, 2018

(87) PCT Pub. No.: WO2018/014849
PCT Pub. Date: Jan. 25, 2018

(65) Prior Publication Data
US 2019/0213211 A1 Jul. 11, 2019

(30) Foreign Application Priority Data
Jul. 20, 2016 (CN) .......................... 201610578808.7
Nov. 30, 2016 (CN) .......................... 201611080129.3

(51) Int. Cl.
*G06F 16/535* (2019.01)
*G06F 16/955* (2019.01)
(Continued)

(52) U.S. Cl.
CPC .......... *G06F 16/535* (2019.01); *G06F 3/0485* (2013.01); *G06F 16/955* (2019.01); *G06F 16/9535* (2019.01); *H04N 21/812* (2013.01)

(58) Field of Classification Search
CPC .... G06F 16/40; G06F 16/535; G06F 16/9535; G06F 16/955; G06F 3/0485; H04N 21/812
See application file for complete search history.

(56) References Cited

U.S. PATENT DOCUMENTS

| | | | |
|---|---|---|---|
| 2007/0221044 A1* | 9/2007 | Orr | G10H 1/0025 84/609 |
| 2009/0041298 A1* | 2/2009 | Sandler | H04N 5/77 382/103 |

(Continued)

FOREIGN PATENT DOCUMENTS

| | | |
|---|---|---|
| CN | 103164205 A | 6/2013 |
| CN | 103379161 A | 10/2013 |

(Continued)

OTHER PUBLICATIONS

International Search Report for PCT/CN2017/093555 dated Oct. 17, 2017 [PCT/ISA/210].

(Continued)

*Primary Examiner* — Richard L Bowen
(74) *Attorney, Agent, or Firm* — Sughrue Mion, PLLC

(57) ABSTRACT

A media information display method and apparatus, and a computer storage medium are provided. The method includes obtaining media information materials; sequencing the media information materials, and generating first media information based on the sequenced media information materials, the media information materials in the first media information being combined and arranged; controlling a first part of the first media information to be displayed in a first media information display window; and controlling a second (Continued)

part of the first media information to be displayed in the first media information display window in response to an operation on the first media information display window, the first part of the first media information being different from the second part of the first media information.

20 Claims, 12 Drawing Sheets

(51) Int. Cl.
*G06F 16/9535* (2019.01)
*G06F 3/0485* (2022.01)
*H04N 21/81* (2011.01)

(56) References Cited

U.S. PATENT DOCUMENTS

| | | | |
|---|---|---|---|
| 2009/0287554 A1 | 11/2009 | Kim | |
| 2011/0022589 A1* | 1/2011 | Bauer | G06F 16/748 707/723 |
| 2011/0050564 A1* | 3/2011 | Alberth | G06F 3/147 455/566 |
| 2012/0158524 A1* | 6/2012 | Hintz | G06T 13/80 705/14.73 |
| 2012/0158525 A1* | 6/2012 | Kae | G06Q 30/02 705/14.73 |
| 2014/0289680 A1* | 9/2014 | Yamamoto | G06T 1/20 715/838 |
| 2015/0286444 A1* | 10/2015 | Sinn | G06F 3/1288 358/1.9 |
| 2016/0104201 A1* | 4/2016 | Greenberg | G06Q 30/0267 705/14.64 |
| 2016/0147362 A1 | 5/2016 | Eim et al. | |
| 2016/0189249 A1* | 6/2016 | Meyer | H04L 67/26 705/14.66 |
| 2017/0018002 A1* | 1/2017 | Champy | H04N 21/41407 |
| 2017/0186212 A1* | 6/2017 | Ai | G06T 15/205 |
| 2017/0289631 A1* | 10/2017 | Lee | H04N 21/4312 |
| 2018/0293455 A1* | 10/2018 | Hardee | G06F 3/0482 |

FOREIGN PATENT DOCUMENTS

| | | |
|---|---|---|
| CN | 105046525 A | 11/2015 |
| CN | 105677868 A | 6/2016 |
| CN | 105760377 A | 7/2016 |
| CN | 106445997 A | 2/2017 |

OTHER PUBLICATIONS

Written Opinion dated Oct. 17, 2017, from the International Searching Authority in International Application No. PCT/CN2017/093555.

Curcuma et al., "Frontiers of E-Commerce Ethics in Big Data Era", Shenyang: Northeast University Press, 1st Edition, pp. 83-84, Mar. 31, 2016, 4 pages total.

Office Action dated Apr. 16, 2020, from the China National Intellectual Property Administration in Application No. 201610578808.7.

* cited by examiner

MEDIA INFORMATION DISPLAY METHOD AND APPARATUS, AND COMPUTER STORAGE MEDIUM

CROSS REFERENCE TO RELATED PATENT APPLICATIONS

This application is a U.S. national stage application under 35 U.S.C. § 371 of International Application No. PCT/CN2017/093555, filed on Jul. 19, 2017, which claims priority from Chinese Patent Application No. 201611080129.3, filed with the Chinese Patent Office on Nov. 30, 2016 and Chinese Patent Application No. 201610578808.7, filed with the Chinese Patent Office on Jul. 20, 2016, the disclosures of each of which are incorporated by reference in their entirety.

BACKGROUND

1. Field

The present disclosure relates generally to information processing, and more specifically relates to a media information display method and apparatus, and a computer storage medium.

2. Description of Related Art

With the development of Internet technology, more and more data (including text, images, audios, videos, etc.) will be pushed to users through the Internet. For example, when users browse a webpage using a terminal device such as a mobile phone or a PC, they will receive various data pushed by the network side, such as advertisements, public benefit propaganda information, and news in images or video formats. In this way, the users can be timely informed of news and content of interest, etc. Such data may be referred to as push information or push media content. Usually, one media information display window can only display one media information material, and if a plurality of media information materials are to be displayed, a plurality of media information display windows are needed, which would occupy a large number of screen display ranges, resulting in low screen utilization. In addition, it can neither express media information content to the greatest extent, nor satisfy the requirement of displaying a plurality of media information in one media information display window.

SUMMARY

The embodiments of the present disclosure are directed to a media information display method and apparatus, and a computer storage medium.

According to certain aspects of the present disclosure, media information display methods, apparatus, systems and non-transitory computer storage mediums are provided.

By generating first media information based on a plurality of media information materials, controlling to display the first media information containing the plurality of media information materials in a first media information display window, and displaying the part, which is not displayed, of the first media information in the first media information display window by the operation on the first media information display window, the media information display method and apparatus, and the computer storage medium provided in the embodiments of the present disclosure achieve to display the plurality of media information materials in one media information display window and express media information content to the maximum, thereby satisfying the display requirement of multiple products, enhancing the hit rate of media information, and furthermore enhancing the utilization of a terminal display screen.

BRIEF DESCRIPTION OF THE DRAWINGS

The accompanying drawings, which are included to provide further understanding and are incorporated and constitute a part of this specification, illustrate disclosed embodiments and together with the description serve to explain the principles of the disclosed embodiments. In the drawings.

DETAILED DESCRIPTION

Figure 1A:
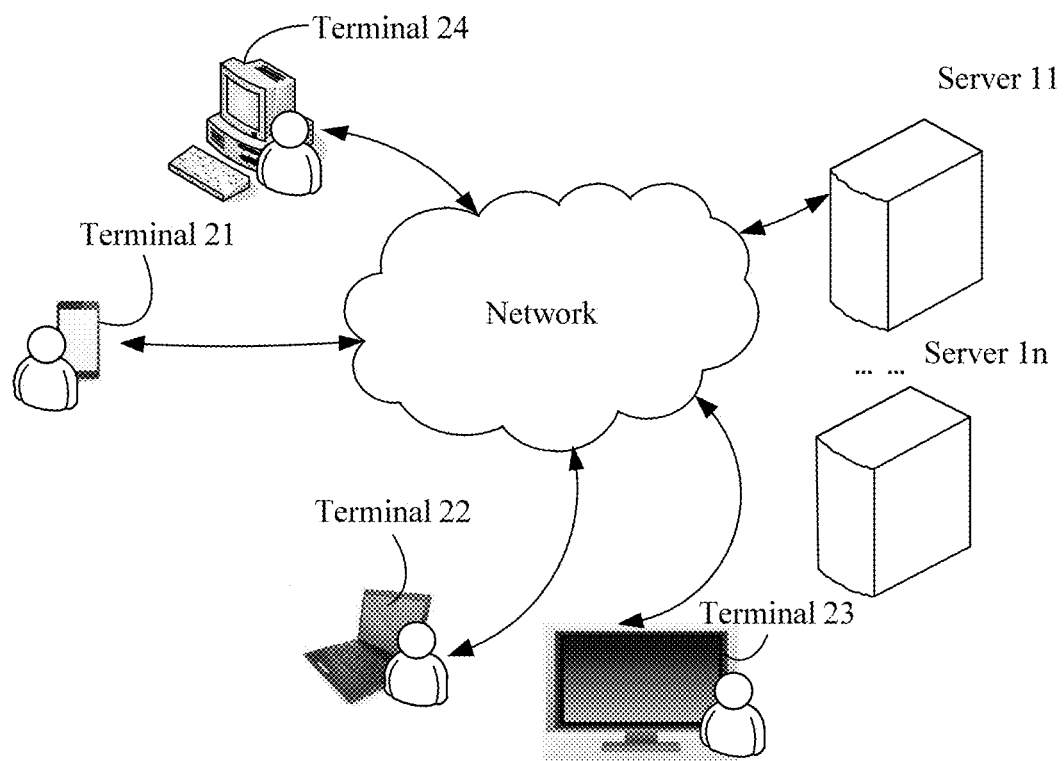
FIG. 1a and FIG. 1b are schematic diagrams of a system architecture for information exchange according to an example embodiment.
Figure 1B:
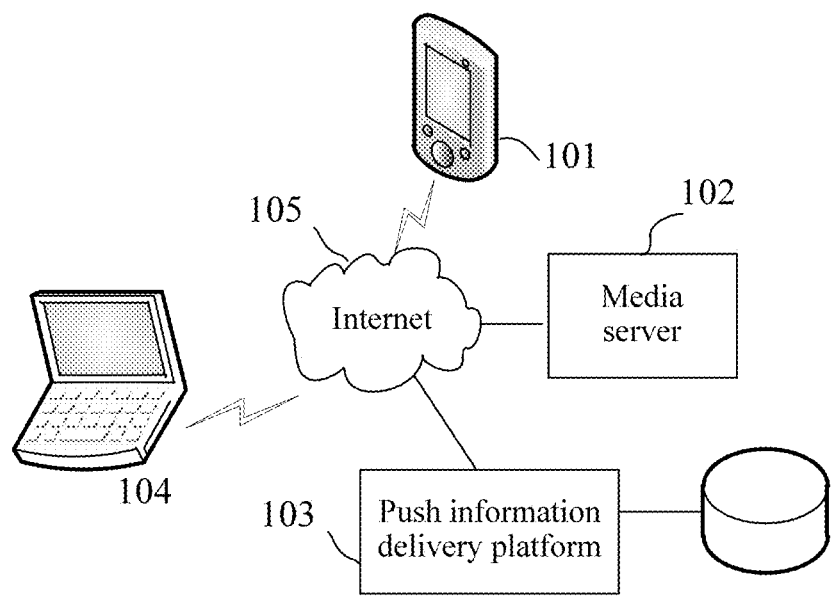

FIG. 1a and FIG. 1b are schematic diagrams of a system architecture for information exchange according to an example embodiment. As shown in FIG. 1a, the system architecture includes a plurality of servers 11, . . . , 1n (generally referred to as servers 11) and four terminal devices 21-24, wherein the terminal devices 21-24 can perform information exchange with the servers 11 via a wired network or a wireless network. In some embodiments, the terminal devices 21-24 may be a mobile phone, a desktop computer, a PC machine, and an AIO machine, etc. In some embodiments, the servers 11 may further perform exchange with a first type of terminal (i.e. a provider of media information materials, or referred to as a terminal of an advertiser, or referred to as an object providing advertising materials and content promotion) via a network, and after the first type of terminal submits the advertisements to be launched, the advertisements are stored in a server cluster; and an administrator can be assigned to perform a series of processing on the advertisements launched from the first type of terminal, such as auditing. In such embodiments, the terminal devices 21-24 may be referred to as a second type of terminals (terminals of ordinary users, or media information display objects, or advertisement display or exposure objects) relative to the first type of terminals, which may be users watching videos via video applications, or users playing games via game applications, or users of instant messaging applications (for example, WeChat) or users of social applications, etc. The media information display windows (for example, advertisement windows) can be added in all applications or specified applications (such as game applications, video applications, instant messaging applications, social applications, navigation applications, etc.) installed in the terminal devices 21-24, to display more media information to users.

FIG. 1b is a schematic diagram of a system architecture for information exchange according to another example embodiment. As shown in FIG. 1b, the system architecture includes an application (APP) client 101, a media server 102, a push information delivery platform 103, and a push information provider client 104. These entities may communicate via the Internet 105.

A terminal user may access the media server 102 via the application client 101, for example, by browsing web pages or watching online videos, etc. When the user accesses the media server 102 via the application client 101, the application client 101 may send an information push request to the push information delivery platform 103, and the push information delivery platform 103 may push media information that matches the information push request (such as pictures, videos, etc.) to the application client 101.

The push information provider may upload media information materials to be pushed to the push information delivery platform 103 via the push information provider client 104, so as to generate corresponding orders used to push the media information.

The information push request sent to the push information delivery platform 103 may carry user information and/or device information and other parameters. The push information delivery platform 103, in response to the information push request, selects orders that match the information push request from the existing orders in the system, and sends the information of the selected orders (including parameters related to media content, such as the URL parameters of materials such as video advertisements or news articles, etc.) to the application client 101, so that the application client 101 can obtain media information corresponding to the selected orders and display the media information.

When the above discussed media content is an advertisement, the system architecture shown in FIG. 1b may be used for implementing advertising in the Internet, of which, the push information delivery platform 103 may be an advertisement delivery platform, and the push information provider may be an advertiser.

A media information display method according to certain aspects of the disclosure may be implemented by the application client 101 shown in FIG. 1a. In such an embodiment, users may browse the content of the webpage via the application client 101. In some embodiments, the application client 101 may be, for example, Weibo, WeChat, QQ, news client, browser, etc., and advertisement push including single pictures or several thumbnails may appear in an area on the current page of the application client 101.

Embodiments according to certain aspects of the disclosure are not limited to the system structure described above with reference to FIG. 1a or FIG. 1b, and some embodiments may be based on a system architecture that is different from that shown in FIG. 1a or FIG. 1b.

The present disclosure will be further described in detail with reference to the accompanying drawings and specific embodiments.

Figure 2:
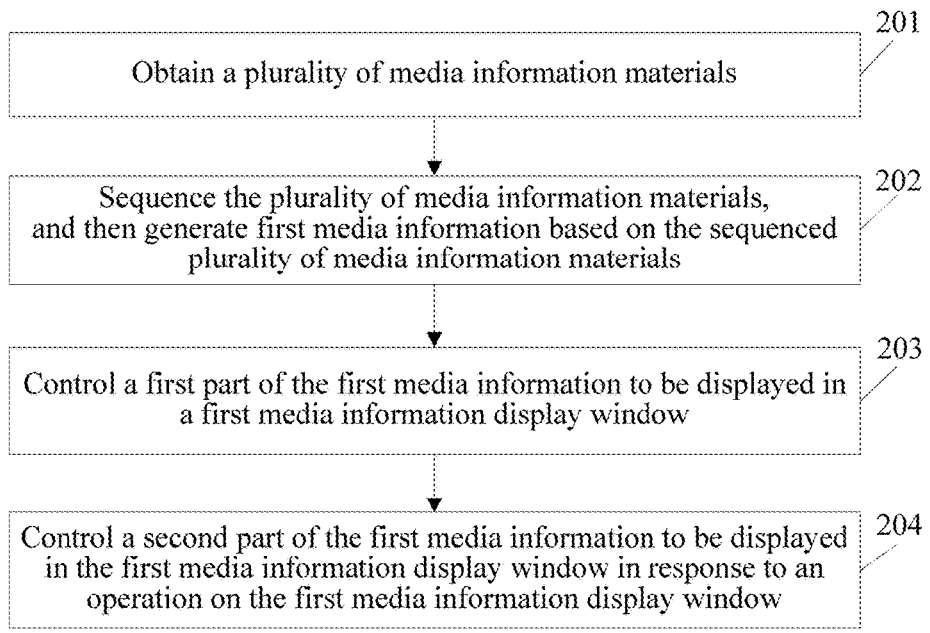
FIG. 2 is a schematic flowchart I of a media information display method according to an example embodiment.

An example embodiment according to certain aspects of the disclosure provides a media information display method. FIG. 2 is a schematic flowchart I of a media information display method according to an example embodiment. As shown in FIG. 2, the information processing method includes the following:

Step 201: Obtain a plurality of media information materials.

Step 202: Sequence the plurality of media information materials, and then generate first media information based on the sequenced plurality of media information materials, the plurality of media information materials in the first media information being combined and arranged.

Step 203: Control a first part of the first media information to be displayed in a first media information display window.

Step 204: Control a second part of the first media information to be displayed in the first media information display window in response to an operation on the first media information display window, the first part of the first media information being different from the second part of the first media information.

The media information display method described in this example embodiment may be implemented using a server or a server cluster. In some embodiments, the media information content may include advertisement content, and the server or server cluster may be a server or server cluster for advertisement push.

In some embodiments, a server obtains a plurality of media information materials. The plurality of media information materials may be picture materials. In some embodiments, the server obtains a plurality of picture materials. In some embodiments, the plurality of media information materials further may include text materials. In some embodiments, the media information content may be advertisement content an advertiser may upload the advertising material to be promoted to the delivery platform that stores the advertising materials available to an advertising database. When advertising, the server may obtain the advertising materials from the advertising database to carry out subsequent operations, such as, competitive sequencing, etc.

In an example embodiment, when the first media information is displayed in the first media information display window, only the first part of the first media information instead of all contents can be displayed in the first media information display window, and the media information materials of prior ranking may be easily browsed by terminal users. Therefore, it is important that whether the media information materials of prior ranking may be hit by users for the first media information. Based on this, the server sequences the plurality of media information materials available according to a preset sequence manner, to determine which media information material is ranked first, and which media information material is ranked second, third, and so on. Further, the sequenced plurality of media information materials are generated into first media information and the generated first media information may be specifically in a picture format, that is, the plurality of media information materials are generated into a picture.

Figure 3:
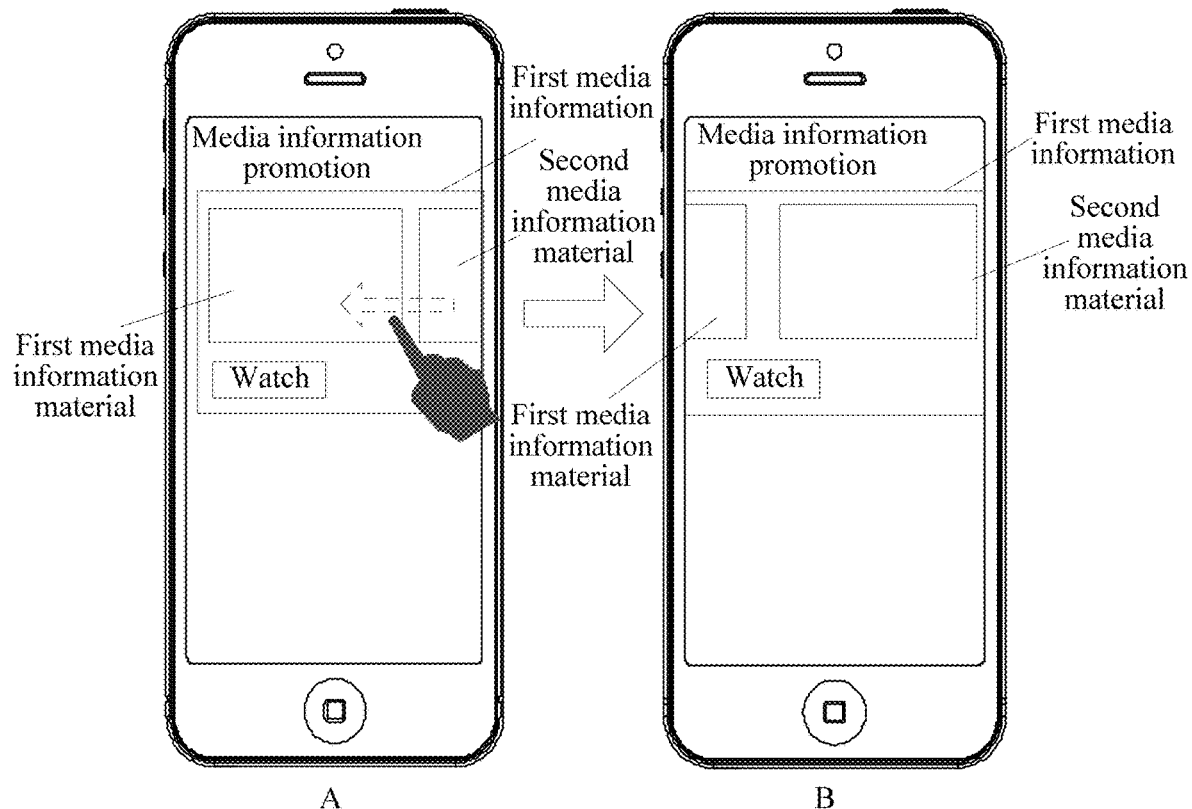
FIG. 3 is a schematic diagram of an application of a media information display method according to an example embodiment.

FIG. 3 is a schematic diagram of an application of a media information display method according to an example embodiment of the present disclosure. As shown in FIG. 3, the sequenced plurality of media information materials may be arranged in the same direction to generate first media information of a picture, and the arrangement direction of the plurality of media information materials can adapt to the display direction of the display content in the terminal. For example, when the display content of the terminal is arranged from left to right in sequence, the arrangement direction of the plurality of media information materials can be horizontal, as shown in FIG. 3A, displaying first media information of a picture in the media information display window; under the initial state, the first part of the displayed first media information includes a first media information material ranking the first, that is, displaying the first picture contained in the first media information. In some embodiments, the controlling the first media information to be displayed in a first media information display window includes controlling the first media information display window to display the first part of the first media information and prompt information, where the prompt information is used to indicate support of displaying the second part, which is not displayed, of the first media information in the first media information display window by the operation on the first media information display window. That is to say, the first media information display window further displays the prompt information, where the prompt information is used to indicate support of displaying the second part, which is not displayed, of the first media information in the first media information display window by a trigger operation. In the example embodiment shown in FIG. 3A, the prompt information is part of a second media information material adjacent to the first media information material, that is, part of a second picture. The displaying part of the second picture in the first media information display window may allow terminal users to be aware that the media information displayed in the first media information display window is not a complete display, and users can switch the display area of the first media information in the first media information display window in response to an operation on the first media information display window (in FIG. 3, the operation may be a sliding trigger operation), that is, controlling the second part of the first media information to be displayed in the first media information display window, to display the first media information completely. For details, refer to FIG. 3A and FIG. 3B. In the first media information display window, by a sliding trigger operation along the left direction, the picture data that represents the first media information is triggered to switch by sliding along the left direction, so that the media information material hidden in the first media information can be fully displayed in the first media information display window. Correspondingly, if the first media information further includes a third media information material, the third media information material can be switched to be displayed in the first media information display window by a trigger operation. In this example embodiment, the first part of the first media information displayed in the first media information display window is the least part of the plurality of media information materials, and the least part of the plurality of media information materials at least includes one media information material; that is, due to the limitation of the terminal device display screen size, if the first media information includes n (n is a positive integer greater than 1) media information materials, at most (n−1) media information materials can be displayed in the first media information display window.

In this example embodiment, the prompt information displayed in the first media information display window can be specifically expressed by part of media information material, as shown in FIG. 3A, that is, after the first media information material is fully displayed in the first media information display window, part of a second media information material is displayed adjacently. The expression of the prompt information displayed in the first media information display window is not limited to the example embodiment shown in FIG. 3, which can be further expressed by a thumbnail of the media information material which is not displayed of the first media information or by a prompt identifier.

In some implementations, based on the schematic diagram in FIG. 3A, it can be understood that, after the first media information material is fully displayed in the first media information display window, another media information material that has not been displayed fully may be generated to a thumbnail (i.e. very small picture) of another media information material, wherein the thumbnail of another media information material is displayed in the blank area of the first media information; correspondingly, after fully displaying the second media information material adjacent to the first media information material by a trigger operation, for other media information materials that are not fully displayed, a corresponding thumbnail can be generated. According to the relative location relationship with the second media information material, the thumbnail is displayed in the corresponding location, to indicate that there is a media information material that is not fully displayed, and users can allow it to be displayed fully in the first media information display window by a trigger operation.

According to some other implementations, based on the schematic diagram in FIG. 3A, it can be understood that, after the media information material is fully displayed in the first media information display window, a prompt identifier can be displayed. The prompt identifier may be specifically an arrow identifier and the direction of the arrow for the arrow identifier may be a direction of a trigger operation. The arrow identifier may indicate the trigger operation of a user in the direction indicated by the arrow of the arrow identifier, to display another media information material that is not displayed of the first media information. Of course, the prompt identifier may not be limited to any identifier way.

In some embodiments, when the first media information satisfies a display requirement, the first media information is controlled to be displayed in the first media information display window. Taking the first media information content being advertisement content as an example, to judge if the first media information satisfies the display requirement, specifically, it needs to determine if the first media information can satisfy the requirement of an advertising bidding schedule, that is, to determine if the expected revenue of the first media information reaches a maximum. In practical applications, the quantity of media information display windows N (N is a positive integer) can be obtained firstly; and then the expected revenue of all media information is sequenced; if the expected revenue of the first media information is ranked in the top $N^{th}$ position in all media information, it may be determined that the first media information satisfies the display requirement.

Example embodiments according to certain aspects of the disclosure achieve displaying a plurality of media information materials in one media information display window by generating first media information based on the plurality of media information materials, and controlling display of the first media information in the first media information display window, so as to express the media information creativity and even media information content to the great extent and meet the display requirements of a plurality of products, thereby improving the click rate of media information, and in addition, improving the utilization of a mobile terminal display screen.

Figure 4:
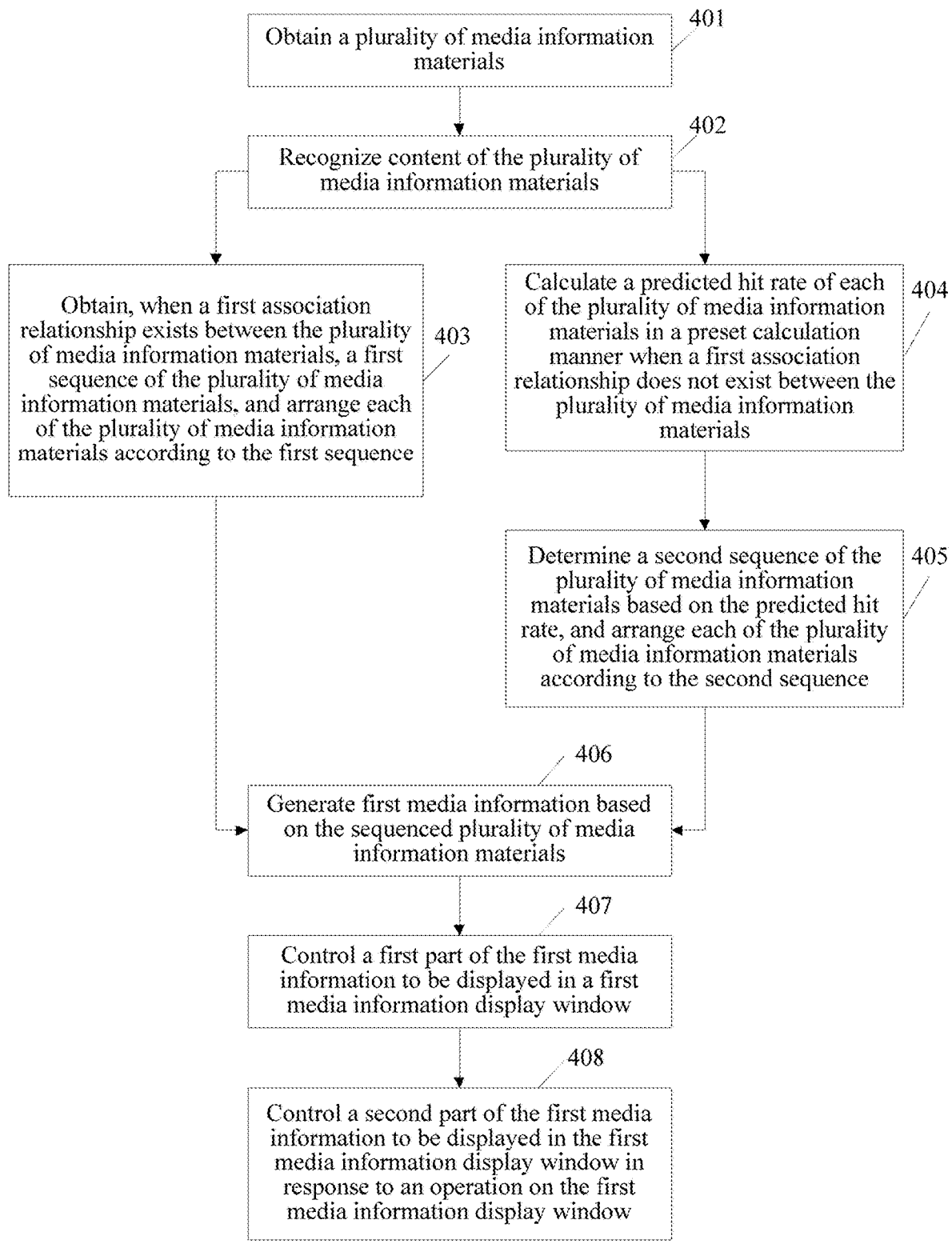
FIG. 4 is a schematic flowchart II of a media information display method according to an example embodiment.

Some example embodiments further provide a media information display method. FIG. 4 is a schematic flowchart II of a media information display method according to an example embodiment. As shown in FIG. 4, the media information display method includes the following:

Step 401: Obtain a plurality of media information materials.

Step 402: Recognize content of the plurality of media information materials.

Step 403: Obtain, when it is determined based on a recognition result that a first association relationship exists between the plurality of media information materials, a first sequence of the plurality of media information materials based on the first association relationship, and arrange each of the plurality of media information materials according to the first sequence. Further implement step 406.

Step 404: Calculate a predicted hit rate of each of the plurality of media information materials in a preset calculation manner when it is determined based on a recognition result that a first association relationship does not exist between the plurality of media information materials.

Step 405: Determine a second sequence of the plurality of media information materials based on the obtained predicted hit rate, and arrange each of the plurality of media information materials according to the second sequence. Further implement step 406.

Step 406: Generate first media information based on the sequenced plurality of media information materials, the plurality of media information materials in the first media information being combined and arranged.

Step 407: Control a first part of the first media information to be displayed in a first media information display window.

Step 408: Control a second part of the first media information to be displayed in the first media information display window in response to an operation on the first media information display window, the first part of the first media information being different from the second part of the first media information.

In some embodiments, a server obtains a plurality of media information materials; the plurality of media information materials may be specifically picture materials; for example, the server obtains a plurality of picture materials; in another implementation manner, the plurality of media information materials further may include text materials. During actual application, taking media information content being advertisement content as an example, an advertiser may upload the advertising material to be promoted to the delivery platform; the delivery platform will store the advertising materials available to an advertising database; when advertising, the server will obtain the advertising materials from the advertising database to carry out subsequent operations such as competitive sequencing, etc.

Figure 5A:
FIG. 5a to FIG. 5d are schematic diagrams of an application of a media information display method according to an example embodiment.
Figure 5B:
Figure 5C:
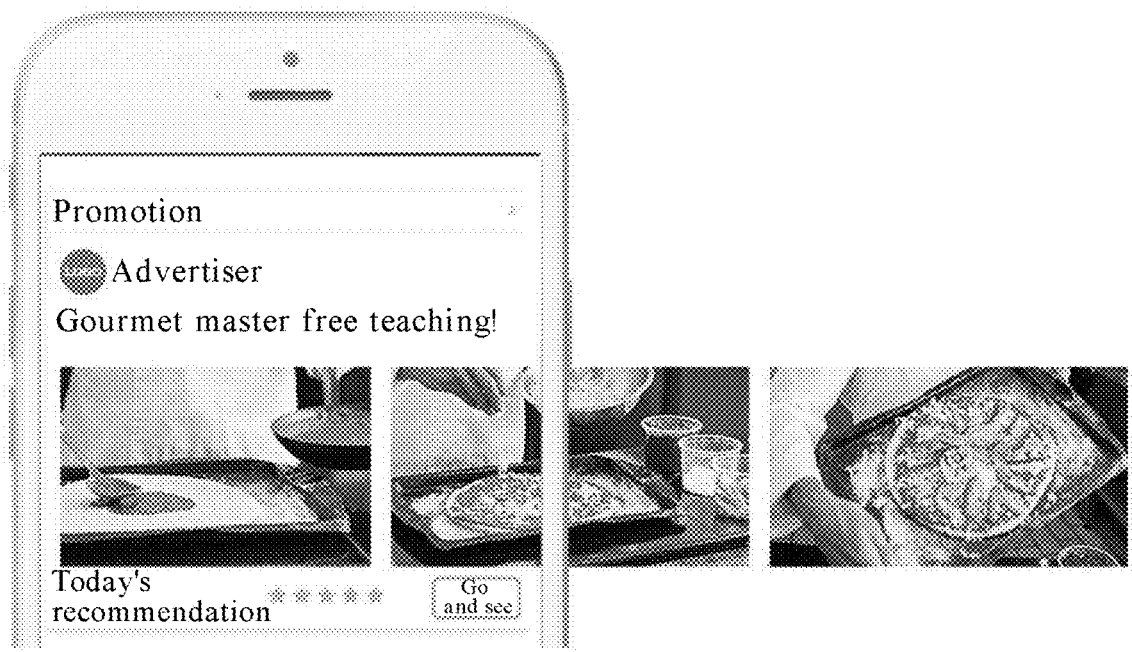
Figure 5D:
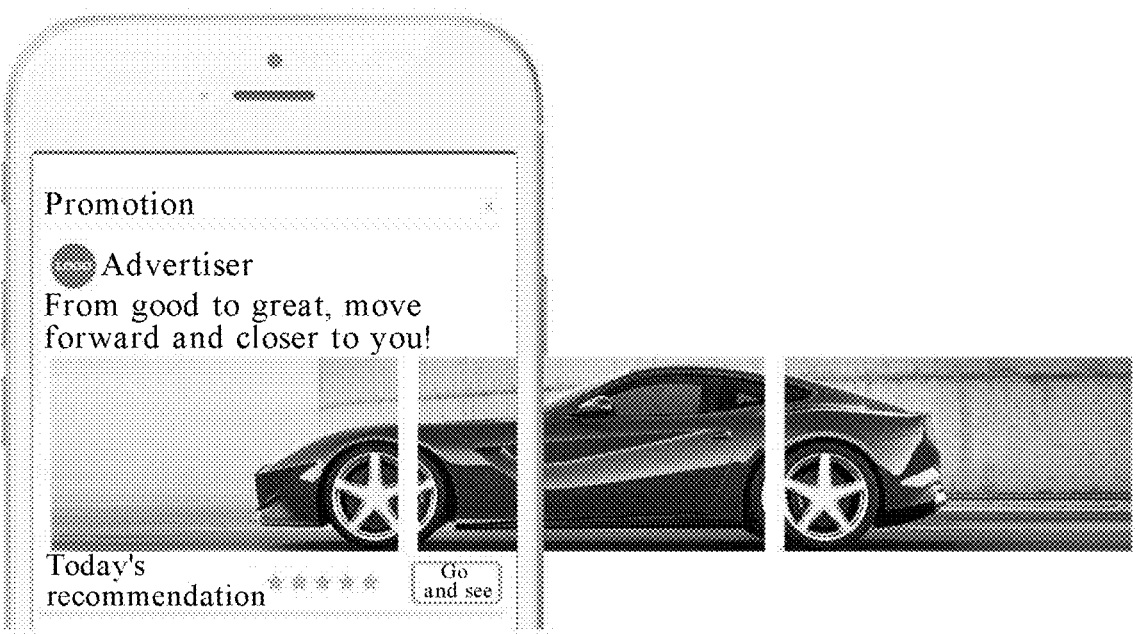

In an example embodiment, a first association relationship may exist or may not exist between the plurality of obtained media information materials; the first association relationship represents existence of a sequence relationship between the contents of the plurality of media information materials. FIG. 5a to FIG. 5d are schematic diagrams of an application of a media information display method according to an example embodiment. As shown in FIG. 5a, the contents of three media information materials do not associate with each other, and the three media information materials display three kinds of items respectively. Also as shown in FIG. 5b, the contents of the three media information materials are all the same, but the three media information materials do not have a sequence relationship, but are only details of the displayed items. The three media information materials shown in FIG. 5c represent the use steps of an item, and the use steps must be implemented according to a sequence. Also as shown in FIG. 5d, the combination of the three media information materials displayed represents an item, that is, the three media information materials can be assembled into the item according to a predetermined sequence. Therefore, the three media information materials need to be arranged according to a sequence. Based on the description, a first association relationship does not exist between the plurality of media information shown in FIG. 5a and FIG. 5b, while a first association relationship exists between the plurality of media information shown in FIG. 5c and FIG. 5d.

Based on this, before the sequencing the plurality of obtained media information materials, firstly the contents of the plurality of media information materials are recognized, to recognize picture information and/or text information of each media information material; and the association between the plurality of media information materials is judged based on the recognized picture information and/or text information; if the plurality of media information materials has a sequence, it is determined that a first association relationship exists between the plurality of media information materials. Correspondingly, the sequence of the plurality of media information materials is a first sequence of the plurality of media information materials, and the plurality of media information materials are arranged according to the first sequence. In another implementation manner, the first association relationship between the plurality of media information materials can be specifically determined by configuring the sequence of the plurality of multimedia information materials, then the multimedia information materials can be sequenced according to the sequence of the configured plurality of multimedia information materials, as shown in the application scenarios in FIG. 5c and FIG. 5d. The sequence of each picture is pre-configured, and three pictures are sequenced according to the configured sequence.

In some embodiments, if the content of the plurality of media information materials is irrelevant, without a sequence, it is determined that a first association relationship does not exist between the plurality of media information materials; then sequencing is performed according to the predicted hit rate of the plurality of media information materials, and the higher the predicted hit rate is, the higher the ranking is; it can be understood that the media information material with the highest predicted hit rate ranks the first in the first media information; correspondingly, the media information material with the second highest predicted hit rate ranks the second in the first media information, and so forth.

In some implementations, the calculating a predicted hit rate of the plurality of media information materials comprises: recognizing content feature data of each of the plurality of media information materials, wherein the content feature data comprises picture feature data and/or text feature data; obtaining user attribute data, wherein the user attribute data comprises user image data and/or user historical behavior data; and determining the predicted hit rate of each of the plurality of media information materials based on the content feature data of each of the plurality of media information materials and the user attribute data.

In some embodiments, a server can learn through off-line data, to obtain a calculation model of the predicted hit rate. Specifically, by studying through the obtained user image data (specifically including user gender, user age, user's area, user's interest and hobby, and user's occupation, etc.) and user historical behavior data (specifically including advertisement clicked, type of the clicked advertisement or attribute information of advertising material content, etc.), the calculation model of a predicted hit rate of a type of media information or a type of media information with content attribute is established by a logistic regression algorithm. Then based on the content feature data of the plurality of media information materials and the established calculation model of the predicted hit rate, the predicted hit rate of each media information material is calculated. The predicted hit rate is a prediction of the server on the hit rate of media information materials, and a higher predicted hit rate indicates a higher probability of hitting the media information materials by users; correspondingly, a lower predicted hit rate indicates a lower probability of hitting the media information materials by users. Based on this, the server sequences according to the predicted hit rate of each of the plurality of media information material, and the media information material with higher predicted hit rate ranks first and the media information material with lower predicted hit rate ranks behind. The reason is that when the first media information is displayed in the first media information display window, only the first part of the first media information can be displayed in the first media information display window, but not all contents of the first media information are displayed, so the media information materials ranking first are easily browsed by terminal users. Therefore, the media information material with the highest predicted hit rate may be browsed by users directly under the initial state, greatly increasing the probability of hitting the media information material, and to a certain extent, the greater the hit rate of the media information material is, the greater the advertiser's revenues are.

In some embodiments, the first media information is generated based on the sequenced plurality of media information materials; the generated first media information may be specifically in a picture format, that is, to generate a picture from the plurality of media information materials. In some implementations, the sequenced plurality of media information materials may be arranged in the same direction to generate first media information of a picture.

In some implementations, before the controlling the first media information to be displayed in a first media information display window, the method further includes obtaining a predicted hit rate of the first media information, and determining a first parameter of the first media information based on the predicted hit rate of the first media information, where the first parameter represents an expected attention degree after the first media information is displayed; and correspondingly, the controlling the first media information to be displayed in a first media information display window comprises: controlling the first media information to be displayed in the first media information display window when the first parameter of the first media information satisfies a predetermined requirement.

In some embodiments, when the server judges whether the first multimedia information can be pushed to the terminal, for the consideration of maximum revenues, firstly it is required to obtain a predicted hit rate of the first media information, and determine a first parameter of the first media information based on the predicted hit rate of the first media information, wherein the first parameter represents an expected attention degree after the first media information is pushed. The first parameter can be specially expressed by eCPM; eCPM represents the revenue of one thousand times of displays. Because the first parameter=predicted hit rate×price, the size of the first parameter of the first multimedia information is related to the predicted hit rate of the first multimedia information, provided that the price is fixed.

Based on this, the predicted hit rate of the first media information should be determined first.

In some embodiments, the obtaining a predicted hit rate of the first media information includes calculating a predicted hit rate of each of the plurality of media information materials in a preset calculation manner, and calculating a bias cancellation factor of each of the plurality of media information materials, wherein the bias cancellation factor of each media information material represents an index parameter of an offset of the media information material in the first media information display window; and determining the predicted hit rate of the first media information according to the bias cancellation factor of each media information material in the plurality of multimedia information materials and the predicted hit rate of each media information material in the plurality of multimedia information materials.

In some embodiments, the predicted hit rate of the first media information satisfies the following expression:

$$PCTR(AD) = a\prod_{1}^{n} PCTR(CREATIVE_n)'BIAS_n \quad (1)$$

where PCTR (AD) represents the predicted hit rate of the first media information; PCTR (CREATIVEn) represents the predicted hit rate of the $n^{th}$ media information material; $BIAS_n$ represents the bias cancellation factor of the $n^{th}$ media information material.

Specifically, calculating a predicted hit rate of each of the plurality of media information materials in the first media information includes recognizing content feature data of each of the plurality of media information materials, where the content feature data includes picture feature data and/or text feature data; obtaining user attribute data, where the user attribute data includes user image data and/or user historical behavior data; and determining the predicted hit rate of each of the plurality of media information materials based on the content feature data of each of the plurality of media information materials and the user attribute data. A server may learn through off-line data, to obtain a calculation model of the predicted hit rate. By studying through the obtained user image data (specifically including user gender, user age, user's area, user's interest and hobby, and user's occupation, etc.) and user historical behavior data (specifically including advertisement clicked, type of the clicked advertisement or attribute information of advertising material content, etc.), the calculation model of a predicted hit rate of a type of media information or a type of media information with content attribute may be established by a logistic regression algorithm. Based on the content feature data of the plurality of media information materials and the established calculation model of the predicted hit rate, the predicted hit rate of each media information material may be calculated.

In some embodiments, for each media information material, the corresponding bias cancellation factor is calculated; the bias cancellation factor of each media information material represents an index parameter of an offset of the media information material in the first media information display window. In some embodiments, since the content of a first part of the first media information is displayed in the first media information display window, the predicted hit rate of the first media information may be based on the predicted hit rate of the first part of the first media information displayed in the first media information display window in combination with the predicted hit rate of the second part of the first media information displayed in the first media information display window by a trigger operation (for example, a sliding operation). Referring to the examples embodiments shown in FIG. 3, the first media information material of the first media information can be fully displayed in the initial state, i.e. in the first media information display window, while the second media information material is only partially displayed; the third media information material, if any, is not displayed; users can enable the second media information material and even the third media information to be fully displayed in the first media information display window by a sliding operation. This method has the advantage of too high hit rate, therefore, the data of each media information material should be processed by a weighted average method by bias cancellation, to obtain the predicted hit rate of the first media information.

The predicted hit rate of each of the plurality of media information materials is associated with the corresponding bias cancellation factor. For the sequencing of different media information materials in the first media information, the association may be positive or negative association. For a media information material ranking the first, due to the highest predicted hit rate, the trigger operation corresponding to the bias cancellation factor corresponding to this media information material will cause offset of the media information material in the first media information display window, and cause partial display or no display of the media information material in the first media information display window, reducing the hit rate of the media information material. For another media information material ranking behind (the another media information material is a media information material that is not fully displayed or not displayed in the first media information display window), since the corresponding predicted hit rate is not the maximum, the trigger operation corresponding to the bias cancellation factor corresponding to this media information material will cause offset of the another media information material in the first media information display window, and cause partial display or full display of the another media information material in the first media information display window, increasing the hit rate of the another media information material. Specifically, the server can determine the corresponding bias cancellation factor according to the content feature data of each of the plurality of media information materials (specifically the content feature data may include picture feature data and/or text feature data) and user attribute data (specifically the user attribute data may include user image data and/or user historical behavior data) as well as specific location of each media information material in the first media information (for example, whether the picture in the first location or the picture in the second or third location).

In some embodiments, the server obtains the predicted hit rate and bias cancellation factor of each media information material in the first media information, and multiplies the predicted hit rate with the bias cancellation factor of each media information material; then the product of the predicted hit rate and bias cancellation factor of each media information material is summed up, to obtain the predicted hit rate of the first media information.

In some embodiments, after the server obtains the predicted hit rate of the first media information, a first parameter of the first media information is determined based on the predicted hit rate, and the first parameter represents an expected attention degree after the first media information is pushed. When first parameter of the first media information satisfies a predicted requirement, it may be determined that the first media information satisfies the display requirement, and then the first media information is controlled to be displayed in the first media information display window. Taking the first media information content being advertisement content as an example, to determine if the first media information satisfies the display requirement, includes determining if the first media information satisfies the advertising bidding schedule requirement, that is, determining if the first parameter of the first media information (for example, expected revenue) has reached maximum. In practical applications, the quantity of media information display windows N(N is a positive integer) can be obtained firstly; the first parameters of all the media information are sequenced; if the first parameter of the first media information is ranked in the top Nth position in the first parameters of all the media information, it may be determined that the first parameter of the first media information satisfies the predetermined requirement.

For the technical solutions in an example embodiment, on one hand, by generating first media information based on a plurality of media information materials, the display of the first media information including a plurality of media information materials in the first media information display window is controlled, and by displaying the part of the first media information that is not fully displayed in response to an operation on the first media information display window, displaying a plurality of media information materials in one media information display window is achieved, to maximize the expression of media information content and satisfy the display requirements of a plurality of products, and in addition, improve the utilization of a mobile terminal display screen; on the other hand, by optimizing the sequence of the plurality of media information materials to be displayed, the media information material with the highest predicted hit rate is ranked first, so that when a user browses the first media information, the fully displayed media information material can more attract user's attention, and drive the user to click the media information material, or browse another media information material that is not fully displayed by a trigger operation (for example, a sliding operation), to enhance the hit rate of the media information to some extent and increase the revenues of the advertiser.

Figure 6:
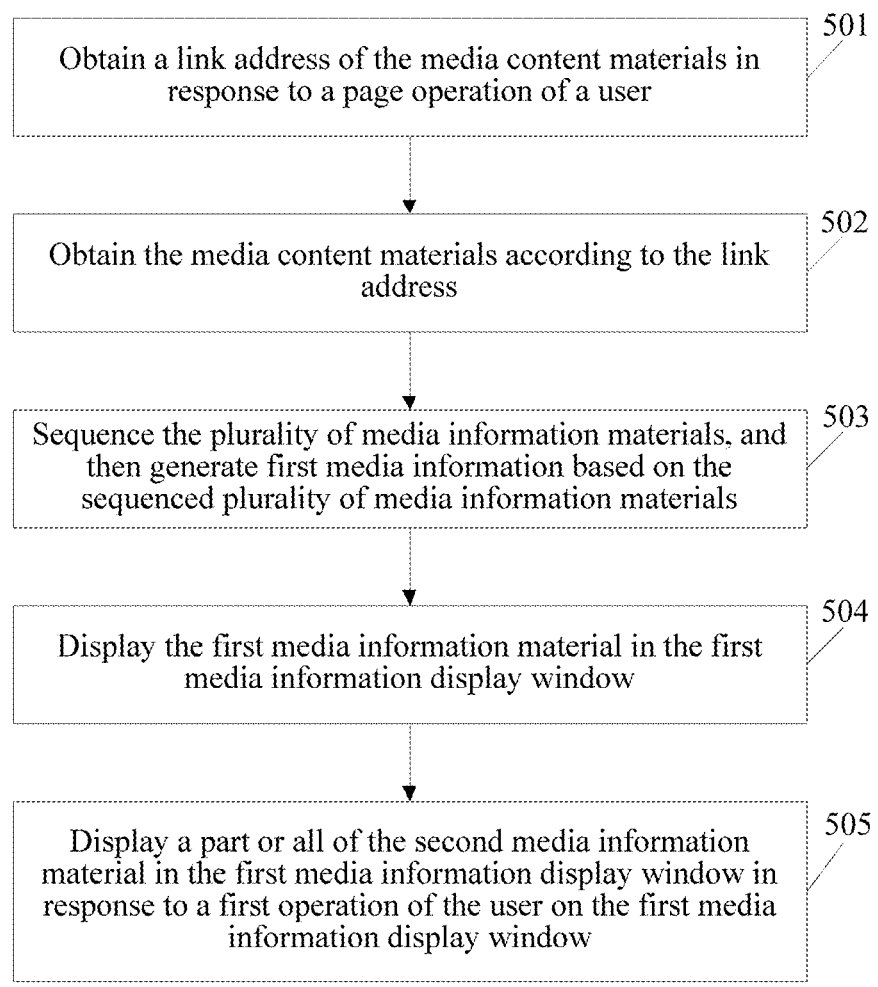
FIG. 6 is a schematic flowchart III of a media information display method according to an example embodiment.

An example embodiment further provides a media information display method. FIG. 6 is a schematic flowchart III of a media information display method according to an example embodiment. As shown in FIG. 6, the example method includes the following:

Step 501: Obtain a link address of the media content materials in response to a page operation of a user.

The page operation of the user may include opening an application client, opening a certain page of an application client, or dragging a page, etc. These page operations can be input through various input devices of user equipment where the application client is located, which may be a mouse movement, a mouse button click, and various gesture operations on a touch screen (such as clicking, long pressing, sliding, tapping, dragging, scrolling, etc.), or input by a touch pen, a verbal instruction input via a microphone, or device posture change monitored by a gravity sensor, or biological feature input detected by a camera module, a fingerprint recognition module or an infrared module, or a combination of any of the above items.

When monitoring the above page operations, the software development kit (SDK) for implementing information push in the application client will send an information push request to the server. The server can perform the order processing for the information push request and determine an order to be pushed that matches with the information push request. The order describes the link address of the media information material and display location information on the pages, further describes user orientation, device orientation information, and the order that matches with the information push request means that the display location information described in the order and user orientation and/or device orientation match with the display location information carried by the information push request and user information and/or device information. After that, the push information delivery platform sends the determined information of the order to be pushed (order identifier, link address of the media information material, etc.) to the application client. In this way, the SDK for implementing information push in the application client can obtain the link address of the media information material from the received order information.

Step 502: Obtain the media content materials according to the link address, wherein the media information materials comprise a first media information material and a second media information material.

The media information material may be pre-loaded into the application client through this step, and then the application client can load and display the media information material in a real-time manner in response to the page operation of the user.

In some embodiments, the first media information material includes at least one picture and/or animation material, and the second media information material comprises at least one picture and/or animation material. Thus the media information materials are divided into two groups, each of which includes at least one picture and/or animation material.

Figure 7A:
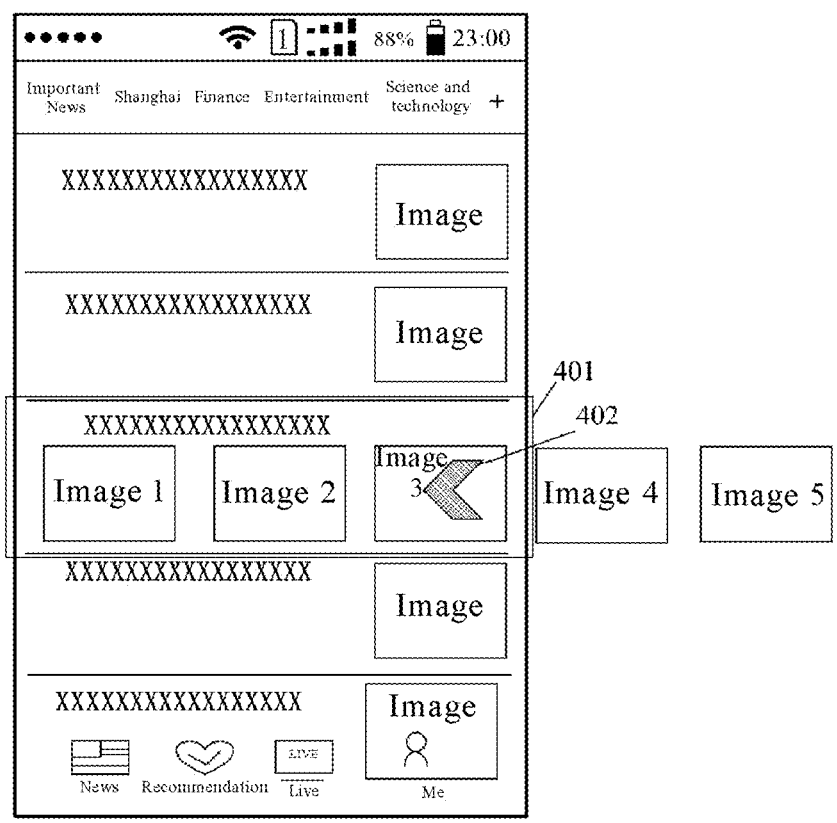
FIG. 7a to FIG. 7d are schematic diagrams of another application of a media information display method according to an example embodiment.

In some embodiments, the media information material may be a series of pictures displaying a product, and meanwhile, the media content material includes a first media information material (for example, 2-3 pieces) displayed in the first screen and a second media information material (for example, 2-3 pieces) that is pre-loaded and not displayed in the first screen. As shown in FIG. 7a, pictures 1-3 are the first media information material, pictures 4-5 are the second media information material, and the first media information material and the second media information material may be distinguished through different identifiers set by the server. When obtaining all media information materials, the application client may distinguish the first media information material from the second media information material according to the identifiers carried by the pictures and/or animation materials. The pictures and/or animation materials that need to be displayed in the first screen can carry specified identifiers, and the application client may display the pictures and/or animation materials that carry the specified identifiers in the first media information display window.

Step 503: Sequence the plurality of media information materials, and then generate first media information based on the sequenced plurality of media information materials, the plurality of media information materials in the first media information being combined and arranged.

The sequencing process in this step can refer to the description in the previous embodiment and it is not described again.

Step 504: Display the first media information material in the first media information display window.

In this step, the first media information material may be first displayed (i.e., displayed in the first screen) in the display area. For example, in advertising, the first media information material may include a part of picture of a complete product (for example, a picture of a head of a car or a car body).

The above media information display window is the area where the display location for displaying push information is located. The size of the display window is related to the size of display location or limited to the size of a user equipment screen; as shown in FIGS. 7a-7c, three pictures can be displayed in the display area 401 in one time.

Step 505: Display a part or all of the second media information material in the first media information display window in response to a first operation of the user on the first media information display window.

The first operation of the user on the first media information display window may be an operation on any location within the first media information display window, or an operation on a specified location or picture in the first media information display window. The first operation can be input through various input devices of user equipment where the application client is located, which may be a mouse movement, a mouse button click, and various gesture operations (such as clicking, long pressing, sliding, tapping, dragging, scrolling, etc.), or input by a tough pen, a verbal instruction input via a microphone, or device posture change monitored by a gravity sensor, or biological feature input detected by a camera module, a fingerprint recognition module or an infrared module, or a combination of any of the above items. The above operations of the user allow the second media information material to be displayed in the page display area of the application client.

Figure 7B:
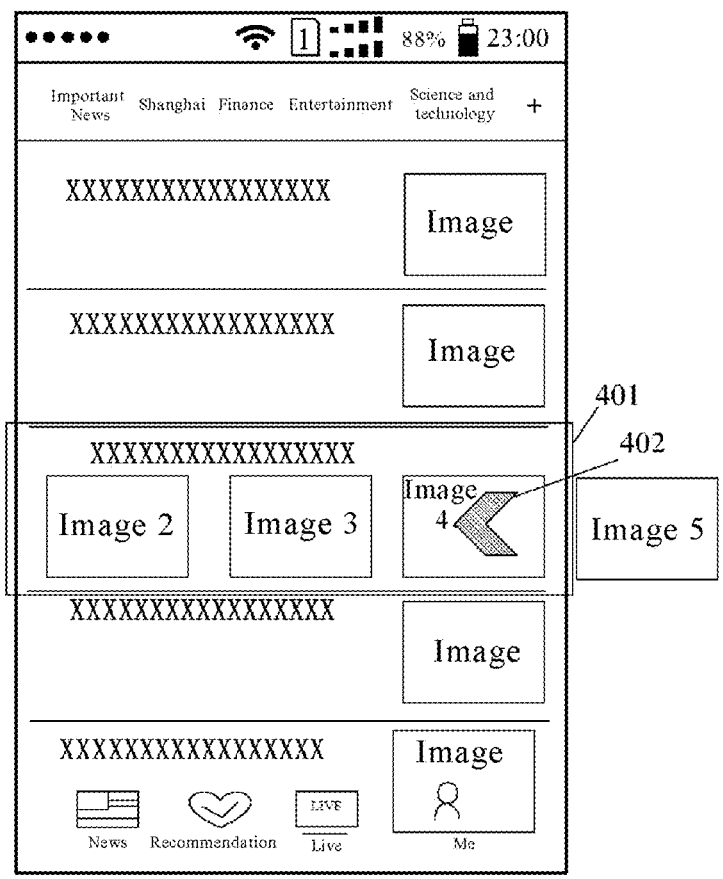
Figure 7C:
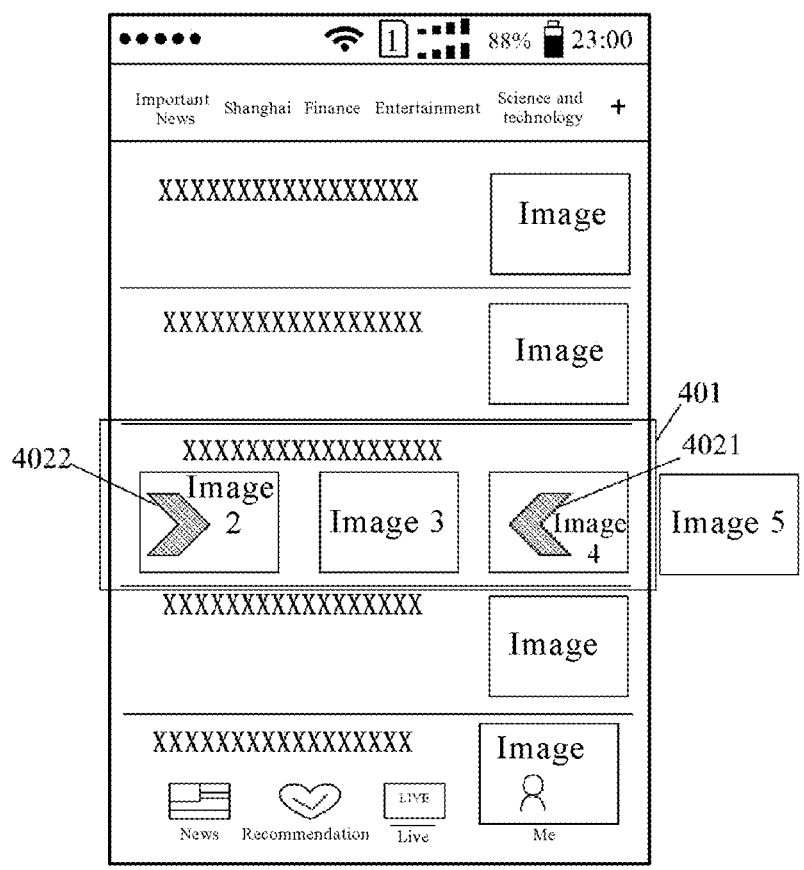

In some embodiments, in response to the first operation of the user on the first media information display window, part of the second media information material (for example, 1-2 pictures) can be displayed, as shown in FIG. 7b; by this way, after the user performs first operation for several times, the application client can fully display the second media information material in the first media information display window.

For example, the second media information material may include the remaining pictures (such as a car's tail, brand logo, etc.) other than the pictures that have been displayed in the first screen for presenting a full product in a group of pictures.

Through the above first operations of the user on the first media information display window, the user can see the remaining pictures that represent a product, so that the content of the first media information can be fully displayed without changing the size of the first media information display window. In this way, in providing media information materials, the size of each material and the number of materials are less limited by the size of the media information display window and the size of the device screen; even if the not all materials can be displayed in the first screen, the remaining materials can be displayed in the next screen or subsequent screens by further operations (such as: clicking, sliding, etc.), thereby enhancing the push effect of media content.

In some embodiments, the method further includes not displaying a part or all of the first media information material in the first media information display window in response to the first operation of a user on the first media information display window. Thus, when displaying the second media information material, a part of all of the first media information material can be removed from the first media information display window, to further improve the display effect.

In some embodiments, three pictures may be displayed in the first media information display window at the same time. The user can remove 1-2 pictures from the first media information display window in the page by implementing the first operation for one time, and remove all three pictures (i.e. first material) displayed in the first screen by implementing the first operation for two or three times.

In some embodiments, the method further includes displaying a part or all of the first media information material in the first media information display window in response to a second operation of the user on the first media information display window.

The second operation type is the same as the first operation type, details are not described herein again. However, a second operation may be in the opposite direction of the first operation, so that the first media information material that is removed from the display area of the first media information display window is moved back to the display area, and meanwhile, the second media information material is moved out of the screen display area.

In some embodiments, a part or all of the first media information material is not displayed in the first media information display window in response to the first operation of the user on the first media information display window, comprising: ending display of the part or all of the first media information material in response to a first gesture operation of the user on the media information display window in a manner of sliding from inside to outside of the first media information display window along a direction corresponding to the first gesture operation.

The gesture operation may include, but is not limited to, clicking, pressing, lifting (lifting off), swiping, dragging by one or more fingers, one time or multiple times of tapping or long pressing, one time or multiple times of sliding (from the left to the right, from the right to the left, upwards and/or downwards) and/or finger pull in contact with the screen (from the right to the left, from the left to the right, upwards and/or downwards).

In some embodiments, the displaying a part or all of the second media information material in the first media information display window in response to a first operation of the user on the first media information display window includes displaying the part or all of the second media information material in response to a first gesture operation of the user on the media information display window in a manner of sliding from outside to inside of the media information display window along a direction corresponding to the first gesture operation.

In some embodiments, the displaying a part or all of the first media information material in the first media information display window in response to a second operation of the user on the first media information display window includes displaying the part or all of the first media information material in response to a second gesture operation of the user on the media information display window in a manner of sliding from outside to inside of the display area along a direction corresponding to the second gesture operation; and ending display of the part or all of the second media information material in a manner of sliding from inside to outside of the display area, that is, switching the display of the first media information material and the second media information material in the first media information display window by the way of sliding-in or sliding-out.

In addition to switching the display of the first media information material and the second media information material in the first media information display window by the way of sliding-in or sliding-out, flipping may be adopted.

For example, in some embodiments, the displaying a part or all of the second media information material in the first media information display window in response to a first operation of the user on the first media information display window, rather than displaying a part or all of the first media information material in the first media information display window, includes displaying the part or all of the second media information material in response to a first gesture operation of the user on the first media information display window in a manner of sliding from outside to inside of the first media information display window along a direction corresponding to the first gesture operation, where the part of all of the second media information material covers a part or all of the first media information material. In some embodiments, the displaying a part or all of the first media information material in the first media information display window in response to a second operation of the user on the first media information display window, rather than displaying a part or all of the second media information material in the first media information display window, includes displaying the part or all of the first media information material in response to a second gesture operation of the user on the first media information display window in a manner of sliding from outside to inside of the first media information display window along a direction corresponding to the second gesture operation, where the part of all of the first media information material covers the part or all of the second media information material.

In some embodiments, the method further includes determining a second link address of a media content material for a third operation and displaying a second page according to the second link address in response to the third operation of the user on the first media information display window.

The second operation type is the same as the first operation type, and it is not described herein again.

In some embodiments, the order information that the server sends to the application client also carries the link address of a landing page preset by the push information provider when jumping to place an order (for example, the URL address of the landing page preset by an advertiser when placing an advertising order, and the landing page is used to further display a brand or product information. When watching an advertisement, a user can perform a specific operation to trigger into the page). The link address of this landing page is a second link address, which is different from the link address of the media information material. The application client may obtain the second link address when obtaining the link address of the media information material in the order information. The user can perform an operation on the first or second media information material displayed in the first media information display window in the page (i.e. third operation, such as clicking a material by a user), to jump to the landing page according to this second link address, to further learn more details about the current media information content pushed.

Here, when monitoring a third operation of the user on a certain material displayed currently (e.g. clicking or long pressing a picture material), the application client may obtain the page data according to the corresponding second link address, to display the landing page.

In some embodiments, the method further includes displaying an operating control in the first media information display window when displaying the first media information material, where the first operation is the operation on the operating control.

In some embodiments, the method further includes displaying a first operating control in the first media information display window when displaying the first media information material; and displaying a second operation control in the first media information display window when displaying the second media information material; the first operation is the operation on the first operating control, and the second operation is the operation on the second operating control.

In some embodiments, the operating control may include, but is not limited to, arrow-click buttons (left to right, right to left, upward and/or downward), arrow-sliding buttons (left to right, right to left, upward and/or downward), and/or arrow-pulling buttons (right to left, left to right, upward and/or downward).

In some embodiments, an arrow button sliding to the left appears at the right-most material of the screen, as shown by 402 in FIGS. 7a-7b, to attract user's interest, so that the user can have active interactions, thereby effectively enhancing the hit rate and reducing the conversion costs. Through setting the arrow button, the promotion information provider can be promoted to optimize the advertising creativity, attract user's attention and make the user generate interest for continued viewing through the content displayed in the first screen.

Through the first operation on the first operating control, the second media information material is displayed in the first media information display window of the page, and through the second operation on the second operating control, the first media information material is returned to the display area of the first media information display window of the page, so that the first media information material and the second media information material are switched on the screen repeatedly.

In some embodiments, the sliding button is a leftward arrow button, as shown in FIGS. 7a-7b; with the direction prompt of the arrow button 402, a user clicks or slides the arrow button 402 along the direction of the arrow, and the SDK used for information push in the application client monitors a sliding gesture event in the display area of the first media information display window (such as to the left), to move the second media information material to the left, and meanwhile, on the right of the screen, the pre-loaded second media information material is displayed from the right to the left of the screen. The second media information material may be, for example, 2 to 3 pieces, so that the first media information material and the second media information material can display the brand and production information in a round way (for example, a complete vehicle and its brand information).

In some embodiments, two arrow buttons with opposite directions 4021 and 4022 appear in the display area when a part of the second material is displayed in response to an operation of the user on the first operating control, as shown in FIG. 7c; at this time, the user may click on any of them, and move the corresponding material to the first media information display window to display. Specifically, as shown in FIG. 7c, the user clicks the leftward arrow button 4021 to continue to move the remaining second media information material to the first media information display window to display. The user clicks the rightward arrow button 4022, then a part or all of the first media information material is moved to the first media information display window again to display, so that the first media information material and the second media information material are switched to display in the first media information display window repeatedly.

Figure 7D:
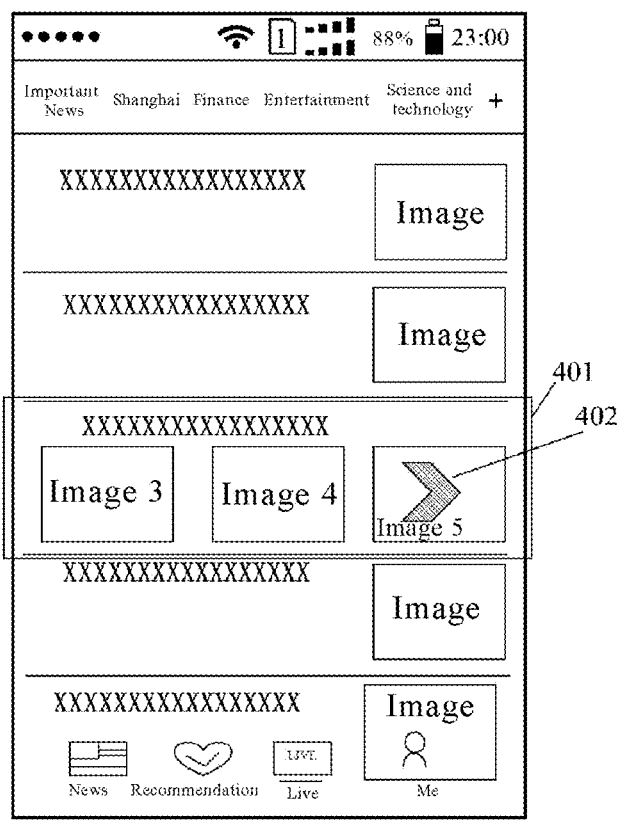

In some embodiments, the slide button may be a dynamic arrow of which the direction may change (for example, left and right directions). When a user clicks the dynamic leftward arrow button 402 in the FIGS. 7a-7b, the application client will slide the second media information material on the right side of the screen inside to display; when the second media information material is fully displayed, this direction of the arrow of the dynamic arrow button 402 can be changed to the right (as shown in FIG. 7d); by this way, when the user clicks this dynamic rightward arrow button 402 in FIG. 7d, the application client will slide the material on the left side of the screen inside to display, so as to achieve sliding back and forth of the first media information material and the second media information material in the screen, to repeatedly display the material of the whole series of products and allow the user to clearly know the product and brand of the information provider.

In some embodiments, the method further includes conducting statistics on the exposed data of the first media information material and the second media information material displayed in the first media information display window and data of operations of a user on the first media information display window (including the data of first operation, second operation and/or third operation). The server may perform statistics and/or calculation on these exposed data and operation data, to achieve mining and processing of user's data, for example, statistics on the number of exposures, operation times, or may further calculate the estimated remaining inventory, and determine user behavior preference, etc. The push information delivery platform may display these data to the background users.

In some embodiments, the application client may feed back the exposed data corresponding to the first media information material and the second media information material displayed in the first media information display window of the page and the data of operations of the user on the first media information display window to different modules for separate processing.

After the application client reports the operation data to a server, the server may separately perform statistics on the user interaction data in the first media information display window, for example, the number of times of user's clicking the media information material in the first media information display window to open the landing page, and the number of times of user's clicking the push button in the first media information display window to display the second media information material, etc. The server may display the above user interaction data and/or exposed data to the push information provider through a reporting module, so that the push information provider can intuitively know how many users have interactions with this push media content (indicating interest in this push media content), analyze the data to optimize the follow-up media content promotion.

It can be seen from the solution discussed above that the sliding displaying the materials provided in some embodiments need not occupy excessive screen area, thereby reducing the interference of the information flow to users when pushing media content; in addition, the above solution supports a picture form, which avoids the high cost of the video material and facilitates the push information provider (especially the small and medium push information provider) to push; in addition, the information flow push media content provided in the above solution occupies less flow and does not depend on the user network environment, so that users can view them at any time, thereby improving users' experiences.

An example embodiment further provides a media information display method. In some embodiments, specific advertising content processing scenarios may be provided.

Figure 8:
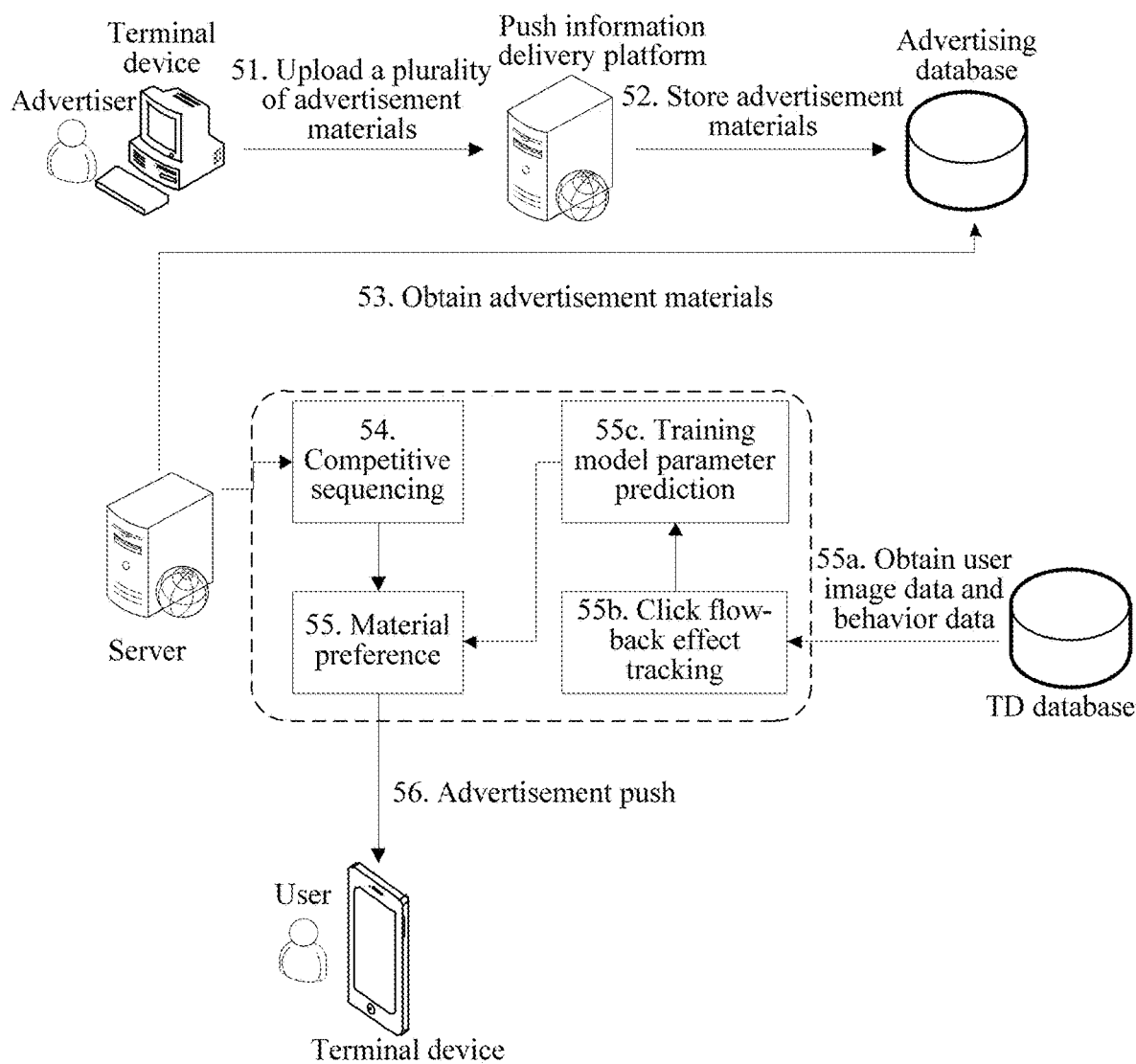
FIG. 8 is a schematic flowchart IV of a media information display method according to an example embodiment.

FIG. 8 is a schematic flowchart IV of a media information display method according to an example embodiment. As shown in FIG. 8, the media information display method includes the following:

Step 51: Upload, by an advertiser, a plurality of advertising materials to the push information delivery platform via a terminal device, where the uploaded plurality of advertising materials at least include a plurality of picture material, further may include text materials, and the picture materials may be specifically static picture content or dynamic picture content.

Step 52: Store, by the push information delivery platform, the obtained plurality of advertising materials to an advertising database, where the plurality of advertising materials are combined into advertisement content, and the combined advertisement content is stored according to an established data structure in the advertising database.

Step 53: Obtain by the server, the advertising materials from the advertising database, specifically, obtain the combined advertisement content from the advertising database, when pushing advertisement, where the advertisement content includes the plurality of advertising materials (i.e. at least three advertising materials). The plurality of advertising materials may be sequenced according to the uploading sequence of the advertiser, or sequenced according to a preset sequence, i.e. no more limitation on the sequence of the plurality of advertising materials.

Step 54: Perform, by the server, the bidding sequence on the advertisement content according to a preset bidding sequence rule. Specifically, the server calculates a predicted hit rate of each advertising material in the advertisement content according to a preset calculation manner, and calculates the bias cancellation factor of each advertising material, and then calculates the predicted hit rate of the advertisement content according to the expression (1) in the embodiment described above. The expected revenue of the advertisement content is obtained by the product of the predicted hit rate and the advertising bid. It is assumed that there are N advertising spaces to be pushed, and N is a positive integer; all the advertisement contents are sequenced in descending order, to obtain the advertisement contents in the first N places, which are the advertising contents to be pushed.

Step 55: Sequence, by the server, a plurality of advertising materials included in the pushed advertisement contents, and before sequencing, implement the process of steps 55*a* to 55*c*, including:

Step 55*a*: Obtain, by the server, user image data and user behavior data from the TD database, wherein the TD database stores offline data, and the offline data comprises the user image data and the user behavior data.

Step 55*b*: Perform, by the server, clicking back-flow effect tracking based on the obtained user image data and user behavior data.

Step 55*c*: Perform, by the server, prediction of training model parameters.

The specific process from steps 55*a* to 55*c* is that, the server learns through offline data, to obtain a training model of the predicted hit rate. Specifically, by learning through the obtained user image data (specifically including user gender, user age, user's area, user's interest and hobby, and user's occupation, etc.) and user historical behavior data (specifically including advertisement clicked, type of the clicked advertisement or attribute information of advertising material content, etc.), the calculation model of a predicted hit rate of a type of media information or a type of media information with content attribute is established by a logistic regression algorithm. Then based on the content feature data of the plurality of advertising materials and the established training model of the predicted hit rate, the predicted hit rate of each advertising material is calculated.

Specifically, in step 55, the server sequences the plurality of advertising materials in the advertisement content to be pushed based on the training model established in step 55*c*, and specifically sequences the plurality of advertising materials based on the calculated predicted hit rate in descending order. The advertising material of the highest predicted hit rate is ranked in the first place, correspondingly, the advertising material of the lowest predicted hit rate is ranked in the last place, and the sequenced plurality of advertising materials is generated to the advertisement content to be pushed.

Step 56: Push, by the server, the generated advertisement content to be pushed to a terminal device for browsing by users.

Some embodiments further provide a media information display method applied to a terminal, including the following:

Step 601: Obtain, by a terminal, first media information pushed by the server, display the first media information in a first media information display window, wherein the first part of the first media information and prompt information are displayed in the first media information display window, the prompt information is used to indicate support of displaying the second part, which is not displayed, of the first media information in the first media information display window by the operation on the first media information display window.

Step 602: Switch, by the terminal, the content of the first media information displayed in the first media information display window based on the trigger operation when detecting a trigger operation based on the prompt information, and display the second part of the first media information in the first media information display window.

Examples in this embodiment can refer to FIG. 3. A plurality of media information materials may be arranged in the same direction. Under the initial state, the first part of the displayed first media information includes the media information material ranking first, that is, displaying the first picture contained in the first media information. The first media information display window further displays prompt information, wherein the prompt information is used to indicate support of displaying the second part, which is not displayed, of the first media information in the first media information display window by a trigger operation. In the example embodiment shown in FIG. 3A, the prompt information is a part of the second media information material adjacent to the first media information material, that is, a part of second picture; the displaying a part of second picture in the first media information display window may allow a terminal user to be aware that the media information displayed in the first media information display window is not a full display, and the user may switch the display area of the first media information in the first media information display window by a trigger operation (in FIG. 3, the trigger operation may be a sliding trigger operation), to fully display the first media information, and for details, refer to FIG. A and FIG. B in FIG. 3. In the first media information display window, by a sliding trigger operation along the left direction, the picture data that represents the first media information is triggered to switch by sliding along the left direction, so that the second media information material hidden in the first media information may be fully displayed in the first media information display window. Correspondingly, if the first media information further includes a third media information material, the third media information material may also be switched to display in the first media information display window by a trigger operation. In some embodiments, the first part of the first media information displayed in the first media information display window is the least part of the plurality of media information materials, and the least part of the plurality of media information materials at least includes one media information material; that is, due to the limitation of the terminal device display screen size, if the first media information includes n (n is a positive integer greater than 1) media information materials, at most (n−1) media information materials may be displayed in the first media information display window.

Figure 9:
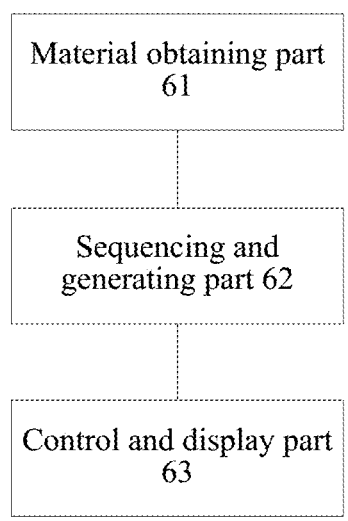
FIG. 9 is a schematic structural diagram of a media information display apparatus according to an example embodiment.

The example embodiment further provides a media information display apparatus. FIG. 9 is a schematic structural diagram of a media information display apparatus according to an example embodiment. As shown in FIG. 9, the apparatus according to an example embodiment includes a material obtaining part 61, a sequencing and generating part 62, and a control and display part 63.

The material obtaining part 61 is configured to obtain a plurality of media information materials.

The sequencing and generating part 62 is configured to sequence the plurality of media information materials, and then generate first media information based on the sequenced plurality of media information materials, the plurality of media information materials in the first media information being combined and arranged.

The control and display part 63 is configured to control a first part of the first media information to be displayed in a first media information display window; and further configured to control a second part of the first media information to be displayed in the first media information display window in response to an operation on the first media information display window, the first part of the first media information being different from the second part of the first media information.

In some implementations, the control and display part 63 is configured to control the first media information display window to display the first part of the first media information and prompt information, where the prompt information is used to indicate support of displaying the second part, which is not displayed, of the first media information in the first media information display window by a trigger operation.

A person skilled in the art should understand that the functions of various processing parts of the media information display apparatus in the example embodiment can be understood with reference to the related description of the foregoing media information display method. The various processing parts of the media information display apparatus in the example embodiment can be achieved through part of analog circuit or processor that achieves the functions described in the example embodiment, or can be achieved by implementing the operation of part of software or program in the smart terminal that achieves the functions described in the example embodiment.

An example embodiment further provides a media information display apparatus, as shown in FIG. 9. The apparatus includes a material obtaining part 61, a sequencing and generating part 62, and a control and display part 63.

The material obtaining part 61 is configured to obtain a plurality of media information materials.

The sequencing and generating part 62 is configured to recognize content of the plurality of media information materials, obtain, when it is determined based on a recognition result that a first association relationship exists between the plurality of media information materials, a first sequence of the plurality of media information materials based on the first association relationship, and arrange each of the plurality of media information materials according to the first sequence, calculate a predicted hit rate of each of the plurality of media information materials in a preset calculation manner when it is determined based on a recognition result that a first association relationship does not exist between the plurality of media information materials, and determine a second sequence of the plurality of media information materials based on the obtained predicted hit rate, and arrange each of the plurality of media information materials according to the second sequence, further configured to generate first media information based on the sequenced plurality of media information materials, and the plurality of media information materials in the first media information are combined and arranged.

The control and display part 63 is configured to obtain a predicted hit rate of the first media information, and determine a first parameter of the first media information based on the predicted hit rate of the first media information, where the first parameter represents an expected attention degree after the first media information is displayed, control the first part of the first media information to be displayed in the first media information display window when the first parameter of the first media information satisfies a predetermined requirement, further configured to control a second part of the first media information to be displayed in the first media information display window in response to an operation on the first media information display window, the first part of the first media information being different from the second part of the first media information.

In some implementations, the sequencing and generating part 62 is generally configured to configure a sequence of the plurality of multimedia information materials; and sequence the plurality of multimedia information materials based on the configured sequence.

In some embodiments, the sequencing and generating part 62 determines whether a first association relationship exists between the plurality of media information materials based on the results of recognizing content of the plurality of media information materials on one hand; and on the other hand, determines a first association relationship exists between the plurality of media information materials based on the preset sequence of the plurality of multimedia information materials.

According to some embodiments, the sequencing and generating part 62 is configured to recognize content feature data of each of the plurality of media information materials, where the content feature data comprises picture feature data and/or text feature data, obtain user attribute data, where the user attribute data comprises user image data and/or user historical behavior data, and obtain the predicted hit rate of each of the plurality of media information materials based on the content feature data of each of the plurality of media information materials and the user attribute data.

In some embodiments, the control and display part 63 is configured to calculate a predicted hit rate of each of the plurality of media information materials in a preset calculation manner, and calculate a bias cancellation factor of each of the plurality of media information materials, where the bias cancellation factor of each media information material represents an index parameter of an offset of the media information material in the first media information display window, and determine the predicted hit rate of the first media information according to the bias cancellation factor of each media information material in the plurality of multimedia information materials and the predicted hit rate of each media information material in the plurality of multimedia information materials. The predicted hit rate of the first media information satisfies the following expression:

$$PCTR(AD) = \overset{n}{\underset{1}{a}} PCTR(CREATIVE_n)' BIAS_n \qquad (1)$$

where, PCTR (AD) represents the predicted hit rate of the first media information; PCTR (CREATIVEn) represents the predicted hit rate of the $n^{th}$ media information material; BIASn represents the bias cancellation factor of the $n^{th}$ media information material.

Specifically, the control and display part 63 is configured to recognize content feature data of each of the plurality of media information materials, where the content feature data comprises picture feature data and/or text feature data, obtain user attribute data, wherein the user attribute data comprises user image data and/or user historical behavior data; and determine the predicted hit rate of each of the plurality of media information materials based on the content feature data of each of the plurality of media information materials and the user attribute data.

A person skilled in the art should understand that the functions of various processing parts of the media information display apparatus in the example embodiment can be understood with reference to the related description of the foregoing media information display method. The various processing parts of the media information display apparatus in the example embodiment can be achieved through part of analog circuit or processor that achieves the functions described in the example embodiment, or can be achieved by implementing the operation of part of software or program in the smart terminal that achieves the functions described in the example embodiment.

The example embodiment further provides a media information display apparatus, as shown in FIG. 9. The apparatus includes a material obtaining part 61, a sequencing and generating part 62, and a control and display part 63.

The material obtaining part 61 is configured to obtain a link address of the media information material in response to a page operation of a user; and obtain the plurality of media information materials according to the link address, the plurality of media information materials including a first media information material and a second media information material.

The sequencing and generating part 62 is configured to sequence the plurality of media information materials, and then generate first media information based on the sequenced plurality of media information materials, the plurality of media information materials in the first media information being combined and arranged.

The control and display part 63 is configured to display the first media information material in the first media information display window; and configured to display a part or all of the second media information material in the first media information display window in response to a first operation of a user on the first media information display window.

In some implementations, the control and display part 63 is further configured to display a part or all of the first media information material in the first media information display window in response to a second operation of a user on the first media information display window.

In some implementations, the control and display part 63 is configured to display the part or all of the second media information material in response to a first gesture operation of the user on the media information display window in a manner of sliding from outside to inside of the media information display window along a direction corresponding to the first gesture operation.

In some implementations, the control and display part 63 is configured to display the part or all of the first media information material in response to a second gesture operation of the user on the media information display window in a manner of sliding from outside to inside of the display area along a direction corresponding to the second gesture operation; and end display of the part or all of the second media information material in a manner of sliding from inside to outside of the display area.

A person skilled in the art should understand that the functions of various processing parts of the media information display apparatus in the embodiment of the present invention can be understood with reference to the related description of the foregoing media information display method. The various processing parts of the media information display apparatus in the embodiment of the present invention can be achieved through part of analog circuit or processor that achieves the functions described in the embodiment of the present disclosure, or can be achieved by implementing the operation of part of software or program in the smart terminal that achieves the functions described in the embodiment of the present disclosure.

In embodiments of the present disclosure, the material obtaining part 61, the sequencing and generating part 62 and the control and display part 63 of the apparatus can be achieved by a CPU (Central Processing Unit), a DSP (Digital Signal Processor), an MCU (Microcontroller Unit) or an FPGA (Field Programmable Gate Array).

Figure 10:
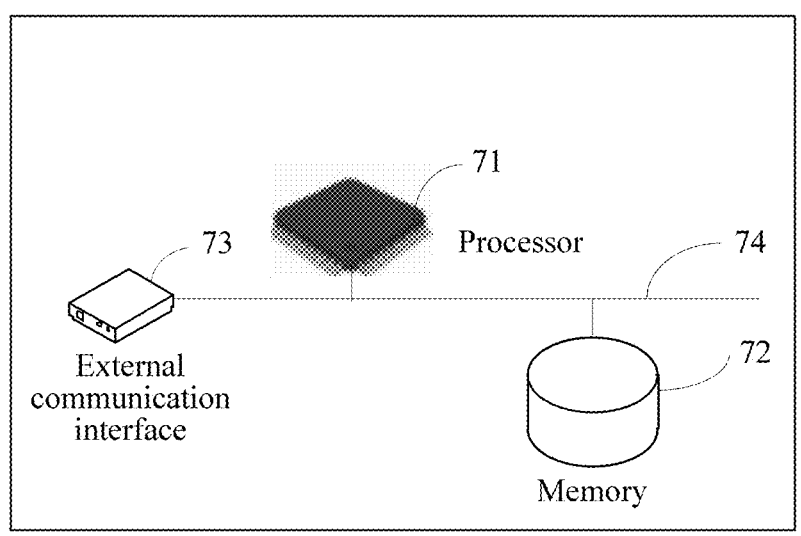
FIG. 10 is a schematic structural diagram of a media information display apparatus as hardware according to an example embodiment.

The media information display apparatus of this embodiment, as a hardware entity, is shown in FIG. 10. The apparatus comprises a processor 71, a memory 72 and at least one external communication interface 73; and the processor 71, the memory 72 and the external communication interface 73 are connected by a bus 74.

The memory 72 may be achieved by any type of volatile or non-volatile storage device, or a combination thereof. A non-volatile memory may be an ROM (Read Only Memory), a PROM (Programmable Read-Only Memory), an EPROM (Erasable Programmable Read-Only Memory), an EEPROM (Electrically Erasable Programmable Read-Only Memory), an FRAM (Ferromagnetic Random Access Memory), a Flash Memory, a magnetic surface memory, an optical disk, or a CD-ROM (Compact Disc Read-Only Memory); the magnetic surface memory may be a disk memory or a tape memory. A volatile memory may be an RAM (Random Access Memory), which is used as an external high speed cache. An exemplary but not restrictive description shows that many types of RAM can be used, for example, an SRAM (Static Random Access Memory), an SSRAM (Synchronous Static Random Access Memory), a DRAM (Dynamic Random Access Memory), an SDRAM (Synchronous Dynamic Random Access Memory), a DDRSDRAM (Double Data Rate Synchronous Dynamic Random Access Memory), an ESDRAM (Enhanced Synchronous Dynamic Random Access Memory), an SLDRAM (SyncLink Dynamic Random Access Memory), and a DRRAM (Direct Rambus Random Access Memory). The memory 804 described in the embodiment of the present disclosure includes, but is not limited to, these memories and a combination thereof.

In some embodiments, the processor 71 may be combined with the data processing apparatus as shown in FIG. 9. The memory 72 stores a group of computer programs, and when being used to run a computer program, the processor 71 performs:

Obtain a plurality of media information materials; sequence the plurality of media information materials, and then generate first media information based on the sequenced plurality of media information materials, the plurality of media information materials in the first media information being combined and arranged; control a first part of the first media information to be displayed in a first media information display window; and control a second part of the first media information to be displayed in the first media information display window in response to an operation on the first media information display window, the first part of the first media information being different from the second part of the first media information.

In an example embodiment, when being used to run the computer program, the processor 71 performs: controlling the first media information display window to display the first part of the first media information and prompt information, wherein the prompt information is used to indicate support of displaying the second part, which is not displayed, of the first media information in the first media information display window by the operation on the first media information display window.

In an example embodiment, when being used to run the computer program, the processor 71 performs: recognizing content of the plurality of media information materials; and obtaining, when it is determined based on a recognition result that a first association relationship exists between the plurality of media information materials, a first sequence of the plurality of media information materials based on the first association relationship, and arranging each of the plurality of media information materials according to the first sequence.

In an example embodiment, when being used to run the computer program, the processor 71 performs: configuring a sequence of the plurality of multimedia information materials; and sequencing the plurality of multimedia information materials based on the configured sequence of the plurality of multimedia information materials.

In an example embodiment, when being used to run the computer program, the processor 71 performs: recognizing content of the plurality of media information materials; calculating a predicted hit rate of each of the plurality of media information materials in a preset calculation manner when it is determined based on a recognition result that a first association relationship does not exist between the plurality of media information materials; and determining a second sequence of the plurality of media information materials based on the obtained predicted hit rate, and arranging each of the plurality of media information materials according to the second sequence.

In an example embodiment, when being used to run the computer program, the processor 71 performs: recognizing content feature data of each of the plurality of media information materials, wherein the content feature data comprises picture feature data and/or text feature data; obtaining user attribute data, wherein the user attribute data comprises user image data and/or user historical behavior data; and determining the predicted hit rate of each of the plurality of media information materials based on the content feature data of each of the plurality of media information materials and the user attribute data.

In an example embodiment, when being used to run the computer program, the processor 71 performs: obtaining a predicted hit rate of the first media information, and determining a first parameter of the first media information based on the predicted hit rate of the first media information, wherein the first parameter represents an expected attention degree after the first media information is displayed; and controlling the first media information to be displayed in the first media information display window when the first parameter of the first media information satisfies a predetermined requirement.

In an example embodiment, when being used to run the computer program, the processor 71 performs: calculating a predicted hit rate of each of the plurality of media information materials in a preset calculation manner, and calculating a bias cancellation factor of each of the plurality of media information materials, wherein the bias cancellation factor of each media information material represents an index parameter of an offset of the media information material in the first media information display window; and determining the predicted hit rate of the first media information according to the bias cancellation factor of each media information material in the plurality of multimedia information materials and the predicted hit rate of each media information material in the plurality of multimedia information materials.

In an example embodiment, when being used to run the computer program, the processor 71 performs: obtaining a link address of the media information materials in response to a page operation of a user; and obtaining the plurality of media information materials according to the link address, wherein the plurality of media information materials comprise a first media information material and a second media information material.

In an example embodiment, when being used to run the computer program, the processor 71 performs: displaying the first media information material in the first media information display window.

In an example embodiment, when being used to run the computer program, the processor 71 performs: displaying a part or all of the second media information material in the first media information display window in response to a first operation of the user on the first media information display window.

In an example embodiment, when being used to run the computer program, the processor 71 performs: displaying a part or all of the first media information material in the first media information display window in response to a second operation of the user on the first media information display window.

In an example embodiment, when being used to run the computer program, the processor 71 performs: displaying the part or all of the second media information material in response to a first gesture operation of the user on the media information display window in a manner of sliding from outside to inside of the media information display window along a direction corresponding to the first gesture operation.

In an example embodiment, when being used to run the computer program, the processor 71 performs: displaying the part or all of the first media information material in response to a second gesture operation of the user on the media information display window in a manner of sliding from outside to inside of the display area along a direction corresponding to the second gesture operation; and ending display of the part or all of the second media information material in a manner of sliding from inside to outside of the display area.

The example embodiment further provides a computer storage medium, for example, a memory 72 containing a computer program. The computer program can be implemented by a processor 71 of a data processing apparatus, to complete the steps of the foregoing method. A computer storage medium may be a memory such as an FRAM, an ROM, a PROM, an EPROM, an EEPROM, a Flash Memory, a magnetic surface memory, an optical disk, or a CD-ROM; or any device that contains any one of the above memories or any combination thereof, such as a mobile phone, a computer, a tablet device, and a personal digital assistant, etc.

A computer readable storage medium provided in the example embodiment stores a computer program, and when the computer program is run by a processor, the computer program performs: obtaining a plurality of media information materials; sequencing the plurality of media information materials, and then generating first media information based on the sequenced plurality of media information materials, the plurality of media information materials in the first media information being combined and arranged; controlling a first part of the first media information to be displayed in a first media information display window; and controlling a second part of the first media information to be displayed in the first media information display window in response to an operation on the first media information display window, the first part of the first media information being different from the second part of the first media information.

In an example embodiment, when the computer program is run by a processor, the computer program performs: controlling the first media information display window to display the first part of the first media information and prompt information, wherein the prompt information is used to indicate support of displaying the second part, which is not displayed, of the first media information in the first media information display window by the operation on the first media information display window.

In an example embodiment, when the computer program is run by a processor, the computer program performs: recognizing content of the plurality of media information materials; and obtaining, when it is determined based on a recognition result that a first association relationship exists between the plurality of media information materials, a first sequence of the plurality of media information materials based on the first association relationship, and arranging each of the plurality of media information materials according to the first sequence.

In an example embodiment, when the computer program is run by a processor, the computer program performs configuring a sequence of the plurality of multimedia information materials; and sequencing the plurality of multimedia information materials based on the configured sequence of the plurality of multimedia information materials.

In an example embodiment, when the computer program is run by a processor, the computer program performs: recognizing content of the plurality of media information materials; calculating a predicted hit rate of each of the plurality of media information materials in a preset calculation manner when it is determined based on a recognition result that a first association relationship does not exist between the plurality of media information materials; and determining a second sequence of the plurality of media information materials based on the obtained predicted hit rate, and arranging each of the plurality of media information materials according to the second sequence.

In an example embodiment, when the computer program is run by a processor, the computer program performs: recognizing content feature data of each of the plurality of media information materials, wherein the content feature data comprises picture feature data and/or text feature data; obtaining user attribute data, wherein the user attribute data comprises user image data and/or user historical behavior data; and determining the predicted hit rate of each of the plurality of media information materials based on the content feature data of each of the plurality of media information materials and the user attribute data.

In an example embodiment, when the computer program is run by a processor, the computer program performs: obtaining a predicted hit rate of the first media information, and determining a first parameter of the first media information based on the predicted hit rate of the first media information, wherein the first parameter represents an expected attention degree after the first media information is displayed; and controlling the first media information to be displayed in the first media information display window when the first parameter of the first media information satisfies a predetermined requirement.

In an example embodiment, when the computer program is run by a processor, the computer program performs: calculating a predicted hit rate of each of the plurality of media information materials in a preset calculation manner, and calculating a bias cancellation factor of each of the plurality of media information materials, wherein the bias cancellation factor of each media information material represents an index parameter of an offset of the media information material in the first media information display window; and determining the predicted hit rate of the first media information according to the bias cancellation factor of each media information material in the plurality of multimedia information materials and the predicted hit rate of each media information material in the plurality of multimedia information materials.

In an example embodiment, when the computer program is run by a processor, the computer program performs: obtaining a link address of the media information materials in response to a page operation of a user; and obtaining the plurality of media information materials according to the link address, wherein the plurality of media information materials comprise a first media information material and a second media information material.

In an example embodiment, when the computer program is run by a processor, the computer program performs: displaying the first media information material in the first media information display window.

In an example embodiment, when the computer program is run by a processor, the computer program performs: displaying a part or all of the second media information material in the first media information display window in response to a first operation of the user on the first media information display window.

In an example embodiment, when the computer program is run by a processor, the computer program performs: displaying a part or all of the first media information material in the first media information display window in response to a second operation of the user on the first media information display window.

In an example embodiment, when the computer program is run by a processor, the computer program performs: displaying the part or all of the second media information material in response to a first gesture operation of the user on the media information display window in a manner of sliding from outside to inside of the media information display window along a direction corresponding to the first gesture operation.

In an example embodiment, when the computer program is run by a processor, the computer program performs: displaying the part or all of the first media information material in response to a second gesture operation of the user on the media information display window in a manner of sliding from outside to inside of the display area along a direction corresponding to the second gesture operation; and ending display of the part or all of the second media information material in a manner of sliding from inside to outside of the display area.

In the example embodiments according to the present disclosure, it should be understood that the disclosed device and method can be achieved through other ways. The apparatus example embodiment described above is merely schematic, for example, the division of parts is only a kind of division of logic functions, which may have other way of division during the actual implementation, such as a combination of multiple parts or components, or integration into another system, or some features can be ignored or not executed. In addition, the coupling, or direct coupling or communication connection of various components displayed or discussed may be indirect coupling or communication connections through some interfaces, devices or parts, or electrically, mechanically, or in other forms.

The above parts as separating components may be, or may not be separated physically, and the parts as displaying components may be, or may not be a physical part, that is, it can be located in a place or distributed on a plurality of network parts; or a part or all of components can be selected to achieve the objectives of the solutions of the embodiment according to actual needs.

In addition, various functional parts in the embodiments of the present disclosure may be integrated into one processing part, or may be separate, or two or more parts are integrated into one part. The integrated part can be achieved in a form of hardware or in a form of hardware and software functional part.

An ordinary person skilled in the art may understand that all or a part of steps to achieve the above method embodiment may be completed through a program which instructs related hardware. The foregoing program may be stored in a computer readable storage medium; when the program is executed, the steps of the foregoing method embodiments are carried out. The foregoing storage medium includes a mobile storage device, an ROM, an RAM, a magnetic disk, an optical disk, and other media that can store program codes.

Alternatively, when the integrated part of the present disclosure is achieved in the form of a software function module and sold or used as a stand-alone product, it can be stored in a computer readable storage medium. Based on this understanding, essentially, the technical solutions of the embodiment of the present disclosure or the part that contributes to the existing technology can be reflected in a form of software product. The computer software product is stored in a storage medium, including a plurality of instructions used to carry out all or a part of the methods in embodiments of the present disclosure in one set of computer device (such as a personal computer, a server or a network device, etc.). The foregoing storage medium includes a mobile storage device, an ROM, an RAM, a disk or an optical disk and other medium that can store program codes.

The above descriptions are merely specific embodiments of the present disclosure, and are not intended to limit the present disclosure in any form. Any equivalent variations or replacements to the above-disclosed technical content made by a person skilled in the art should fall within the scope of protection of the present disclosure. Therefore, the scope of protection of the present disclosure should be subject to the scope of protection claimed in the claims.

INDUSTRIAL APPLICABILITY

The technical solutions of the example embodiments according to the present disclosure achieve to display a plurality of media information materials in one media information display window by generating first media information based on a plurality of media information materials, controlling display of the first media information including the plurality of media information materials in the first media information display window, and displaying the part of the first media information that is not fully displayed through an operation on the first media information display window, so as to express the media information content to the great extent and satisfy the display requirements of a plurality of products, improve the hit rate of media information, and in addition, improve the utilization of a terminal display screen.

What is claimed is:

1. A media information display method comprising:
   obtaining, from a server by a terminal, a plurality of media information materials;
   recognizing, by the terminal, content of the plurality of media information materials;
   calculating, by the terminal, a predicted hit rate of each of the plurality of media information materials in a preset calculation manner when it is determined that a first association relationship indicated by the recognized content does not exist between the plurality of media information materials;
   determining, by the terminal, a sequence of the plurality of media information materials based on the obtained predicted hit rate;
   arranging, by the terminal, each of the plurality of media information materials according to the determined sequence to generate media information;
   displaying, on a display of the terminal, a first portion of the media information in a media information display window; and
   in response to an operation on the media information display window, displaying, on the display of the display terminal, a second portion of the media information in the media information display window, the second portion being different from the first portion.

2. The method according to claim 1, wherein the calculating comprises:
   recognizing content feature data of each of the plurality of media information materials, wherein the content feature data comprises picture feature data and/or text feature data;
   obtaining user attribute data, wherein the user attribute data comprises at least one of user image data and user historical behavior data; and
   determining the predicted hit rate of each of the plurality of media information materials based on the content feature data of each of the plurality of media information materials and the user attribute data.

3. The method according to claim 1, wherein before displaying the first portion of the media information, the method further comprises:
   obtaining a predicted hit rate of the sequenced advertising materials, and determining a first parameter of the sequenced advertising materials based on the predicted hit rate, wherein the first parameter represents an expected attention degree after the first portion is displayed;

wherein the first portion is displayed in the media information display window when the first parameter satisfies a predetermined requirement.

4. The method according to claim 3, wherein obtaining the predicted hit rate of the sequenced advertising materials comprises:

calculating a bias cancellation factor of each of the plurality of advertising materials, wherein the bias cancellation factor represents an index parameter of an offset of the advertising material in the media information display widow; and determining the predicted hit rate of the sequenced advertising materials according to the bias cancellation factor of each advertising material and the predicted hit rate of each advertising material.

5. The media information display method according to claim 1, wherein, when it is determined that the first association relationship exists, determining, by the terminal, an order of the plurality of advertising materials according to the first association relationship and sequencing, by the terminal, the plurality of advertising materials according to the determined order;

displaying, on a display of the terminal, only a first portion of the sequenced advertising materials in a media information display window; and in response to an operation on the media information display window, displaying a second portion of the sequenced advertising materials in the media information display window, wherein the first portion is different from the second portion.

6. The media information display method according to claim 5, wherein the first portion of the first media information is displayed with prompt information that indicates the second portion, which is not displayed in the media information display window, is available for display by the operation.

7. The media information display method according to claim 5, wherein the first association relationship comprises a use sequence of an item, or an assembly sequence of an item.

8. The method according to claim 5, wherein the obtaining the plurality of media information materials comprises:

obtaining a link address of the media information materials in response to a page operation of a user; and obtaining the plurality of media information materials according to the link address.

9. The method according to claim 8, further comprising:

displaying, on the display of the terminal, a portion of the plurality of media information materials other than the plurality of advertising materials.

10. The method according to claim 5, wherein the order is a preset priority ranking.

11. The method according to claim 10, wherein the first portion includes first media information materials of the plurality of media information materials that has a first priority ranking, and the second portion includes second media information materials of the plurality of media information materials that has a second priority ranking.

12. The method according to claim 5, wherein the operation of the user comprises a sliding gesture from outside to inside of the media information display window.

13. The method according to claim 12, wherein the second portion is displayed to slide from outside to inside of the media information display window along a direction corresponding to the sliding gesture.

14. A media information display apparatus comprising:
a display;
at least one memory configured to store computer program code; and
at least one processor configured to access the at least one memory and operate according to the computer program code, the computer program code including:
material obtaining code configured to cause at least one of the at least one processor to obtain a plurality of media information materials;
recognition code configured to cause at least one of the at least one processor to recognize content of the plurality of media information materials;
hit rate calculation code configured to cause at least one of the at least one processor to calculate a predicted hit rate of each of the plurality of media information materials in a preset calculation manner in response to determining that a first association relationship that is indicated by the recognized content does not exist between the plurality of media information materials;
sequencing and generation code configured to cause at least one of the at least one processor to determine a sequence of the plurality of media information materials based on the obtained predicted hit rate, and arrange each of the plurality of media information materials according to the determined sequence to generate first media information;
display code configured to cause at least one of the at least one processor to display a first portion of the first media information in a first media information display window on the display; and in response to an operation on the first media information display window, display a second portion of the first media information in the media information display window, the second portion being different than the first portion.

15. The media information display apparatus according to claim 14, comprising:
order determining code configured to cause at least one of the at least one processor to, when it is determined that the first association relationship exists, determine an order of the plurality of advertising materials according to the association relationship and sequence the plurality of advertising materials according to the determined order; and
display code configured to cause at least one of the at least one processor to display only a first portion of the sequenced advertising materials in a media information display window, and in response to an operation of the media information display window, display a second portion of the sequenced advertising materials in the media information display window, wherein the first portion is different from the second portion.

16. The apparatus according to claim 15, wherein the first portion of the first media information is displayed with prompt information that indicates the second portion, which is not displayed in the media information display window, is available for display by the operation.

17. The apparatus according to claim 15, wherein the association relationship comprises a use sequence of an item, or an assembly sequence of an item.

18. A non-transitory computer readable storage medium storing a program comprising instructions which, when executed by a processor, cause the processor to:
obtain a plurality of media information materials including a plurality of advertising materials;

recognize content of the plurality of advertising materials;

calculate a predicted hit rate of each of the plurality of media information materials in a preset calculation manner when it is determined that a first association relationship indicated by the recognized content does not exist between the plurality of media information materials;

determine a sequence of the plurality of media information materials based on the obtained predicted hit rate;

arrange each of the plurality of media information materials according to the determined sequence to generate media information;

display a first portion of the media information in a media information display window; and in response to an operation on the media information display window, display a second portion of the media information in the media information display window, the second portion being different from the first portion.

19. The non-transitory computer readable storage medium according to claim 18, wherein the program, when executed by a processor, further causes the processor to: when it is determined that the first association relationship exists, determine an order of the plurality of advertising materials according to the first association relationship and sequence the plurality of advertising materials according to the determined order;

display only a first portion of the sequenced advertising materials in a media information display window; and in response to an operation on the media information display window, display a second portion of the sequenced advertising materials in the media information display window, wherein the first portion is different from the second portion.

20. The non-transitory computer readable storage medium according to claim 19, wherein the first portion of the first media information is displayed with prompt information that indicates the second portion, which is not displayed in the media information display window, is available for display by the operation.

* * * * *